United States Patent
Kikuchi

[11] Patent Number: 6,077,349
[45] Date of Patent: Jun. 20, 2000

[54] METHOD AND APPARATUS FOR MANUFACTURING DISC-SHAPED RECORDING MEDIUM

[75] Inventor: Minoru Kikuchi, Miyagi, Japan

[73] Assignee: Sony Corporation, Tokyo, Japan

[21] Appl. No.: 09/136,020

[22] Filed: Aug. 19, 1998

[30] Foreign Application Priority Data

Aug. 20, 1997 [JP] Japan ................................ 9-224098
Sep. 12, 1997 [JP] Japan ................................ 9-249146

[51] Int. Cl.$^7$ ........................... B29D 11/00; B05D 1/00
[52] U.S. Cl. .......................... 118/52; 118/56; 118/319; 118/320; 264/1.33; 264/1.37; 425/3; 425/174.4; 425/810; 427/162; 427/240
[58] Field of Search .................. 264/1.33, 106, 264/107, 1.7, 1.37, 400; 156/74; 425/810, 3, 174.4; 427/162, 240; 118/52, 56, 319, 320

[56] References Cited

U.S. PATENT DOCUMENTS

| | | | |
|---|---|---|---|
| 4,877,475 | 10/1989 | Uchida et al. ........................... | 156/74 |
| 5,744,193 | 4/1998 | Kitano ..................................... | 156/74 |
| 5,888,433 | 3/1999 | Amo ..................................... | 264/1.33 |
| 5,954,908 | 9/1999 | Amo et al. .............................. | 156/74 |
| 5,980,985 | 11/1999 | Kikuchi ................................. | 427/240 |

FOREIGN PATENT DOCUMENTS

| | | | |
|---|---|---|---|
| 54-1602 | 1/1979 | Japan ..................................... | 427/240 |
| 61-5794 | 2/1986 | Japan ..................................... | 427/240 |
| 1-163201 | 6/1989 | Japan ..................................... | 264/1.33 |

*Primary Examiner*—Mathieu D. Vargot
*Attorney, Agent, or Firm*—Hill & Simpson

[57] ABSTRACT

When applying a coating film by a spin coating method on a disc-shaped recording medium, the film thickness difference between the inner rim and the outer rim of the disc has to be suppressed. To this end, a coating liquid is supplied to a center portion of the disc-shaped recording medium and a rotary disc, as a center shaft of a rotary disc is inserted into a recess formed in a turntable on which the disc-shaped recording medium is set and the disc-shaped recording medium and a rotary disc are run in rotation. The coating liquid is spread under the centrifugal force caused by rotation for forming a coating film on the disc-shaped recording medium.

18 Claims, 15 Drawing Sheets

METHOD AND APPARATUS FOR MANUFACTURING DISC-SHAPED RECORDING MEDIUM

BACKGROUND OF THE INVENTION

1. Field of the Invention

This invention relates to a method and apparatus for manufacturing a disc-shaped recording medium, such as a magneto-optical disc. More particularly, it relates to a method and apparatus for applying a coating liquid, such as a material for a protective film, on a disc-shaped recording medium.

2. Description of Related Art

The photomagnetic recording system is such a system in which a recording layer of a magnetic material is locally heated on light irradiation to a temperature higher than the Curie temperature or temperature compensation point to reduce the coercivity in this portion and in which a recording magnetic field is applied to this portion from outside to change partially the direction of magnetization of the recording layer to record information signals. This photomagnetic recording system is finding practical use in an optical filing system, an external storage device for a computer or in a recording device for the audio and video information.

Among recording mediums recorded or reproduced by the above photomagnetic recording system, there is a magneto-optical disc comprised of a recording layer formed on a transparent substrate formed of plastics, such as polycarbonate, plastics or glass. The recording layer of a magneto-optical disc is usually comprised of a magnetic layer for recording information signals thereon and a dielectric film, layered on the magnetic layer, and a light reflective layer of, for example, aluminum, formed as an uppermost layer. The magnetic layer of the magneto-optical disc used has an easy axis in a direction perpendicular to the film surface and exhibits a significant photomagnetic effect. Among these magnetic films, there are magnetic thin films comprised of, for example, a amorphous thin film of an alloy of a rare earth-transition metal. On the light reflecting film laminated on the upper surface of the recording layer is usually formed a protective film of, for example, a UV curable resin, for preventing corrosion or damage in the recording layer.

The magneto-optical disc is not limited to a single-plate type but may also be a double-plate type magneto-optical disc obtained on bonding two magneto-optical discs with their recording layer sides or substrate sides facing each other. With the double-plate type magneto-optical disc, since signals are recorded independently on the recording layers of the respective discs, the recording capacity is double that of the single-plate type magneto-optical disc. Also, since the double-plate type magneto-optical disc is symmetrical with respect to its bonding surface, it is less susceptible to warping or deformation of the substrate against changes in temperature or humidity of the external environment than the single-plate type magneto-optical disc.

The photomagnetic recording system may be roughly classified into a light modulating type of modulating the light for recording signals and a magnetic field modulating type of modulating a recording magnetic field for recording signals. Of these, the magnetic field modulating type system is such a system in which, when recording signals, the recording magnetic field is modulated at an elevated speed for recording signals on the recording layer as the light is continuously illuminated on the disc. Researches are conducted energetically in the magnetic field modulating system since it permits facilitated overwriting, high density recording and fast accessing.

In the magnetic field modulation system, a magnetic field is applied against the recording layer during signal recording by a magnetic head adapted for generating a recording signal magnetic field. Since the magnetic field needs to be inverted at an elevated speed during signal recording, it is not possible to generate an excessively strong magnetic field across the magnetic head used for recording in the magnetic field modulating system. The strength of the magnetic field applied by the magnetic head on the magnetic head is inversely proportionate to the distance between the magneto-optical disc and the magnetic head. That is, the strength of the magnetic field applied across the magnetic head to the magneto-optical disc becomes smaller the larger the distance between the magneto-optical disc and the magnetic head. Thus, in this magnetic head, it is necessary to reduce the distance between the head and the magneto-optical disc for signal recording. Therefore, when the magnetic field is applied across the magneto-optical disc by the magnetic head, it is in general more desirable to apply the magnetic field from the side of the protective film thinner in film thickness than the substrate, than from the side of the substrate.

Also, when illuminating the laser light on the recording layer of the magneto-optical disc from an optical head, a thin film thickness of a light transmitting layer from the light incident surface to the recording layer of the magneto-optical disc is desirable for suppressing occurrence of aberration. Thus, it is more preferred to arrange the optical head on the side of the protective film thinner in film thickness than the substrate to illuminate the laser light from the side of the protective film for laser light illumination, than arranging the optical head on the substrata side.

That is, both the magnetic head and the optical head are preferably arranged on the protective film side of the magneto-optical disc. Thus, there is contemplated an information recording/reproducing system in which an optical head for illuminating a laser light beam on the magneto-optical disc and a magnetic head for applying a magnetic field across the magneto-optical disc are unified and both the optical head and the magnetic head are provided on the protective film side of the magneto-optical disc.

If the optical head and the magnetic head are unified and provided on the protective film side of the magneto-optical disc, the laser light beam from the optical head is illuminated on the recording layer without interposition of the substrate. Thus, the material of the magneto-optical disc is not limited to a transparent material, that is, a substrate formed of an opaque material may be used. Therefore, such a material that is less susceptible to warping or deformation, such as Al, can be used as a substrate. Specifically, if the optical head and the magnetic head are unified and arranged on the protective film side of the disc, it is possible to use a material less susceptible to warping or deformation, such as Al, as a substrate material to prevent warping of the substrate from occurring.

On the light reflecting surface, deposited as an uppermost recording layer, there is formed a protective layer of, for example, UV curable resin, for the purpose of preventing corrosion or damage to the recording layer. This protective film is usually formed by applying a UV curable resin by so-called spin coating.

For forming a protective film by the spin coating method, a disc substrate 101 having a recording layer formed thereon is set on a turntable 102 which is rotated by a spindle motor at a low speed, as shown in FIG. 1. A UV curable resin 103 is applied in a toroidal fashion along the inner rim of the recording area of the disc substrate. The disc substrate 10 is then run in rotation at an elevated speed to stretch the UV curable resin up to the outer rim to form a coating layer of the UV curable resin on the entire surface of the disc substrate 101. The coating film of the UV curable resin is then cured on illumination of UV light to form a protective film on the disc substrate 101. The thickness of the protective film is of the order of approximately 15 µm for achieving a sufficient protective effect.

If the protective film is formed as shown in FIG. 1, the protective film tends to be thicker in film thickness in a direction towards the outer rim of the disc substrate 1. If the coating film is formed by the spin coating method, the comprehensive film thickness of the coating film can be changed by changing operating conditions, such as viscosity of the coating liquid, herein the UV curable resin, the rpm of an article for coating, herein the disc substrate, or the rotating time duration. However, if the protective film is formed as shown in FIG. 1, it is difficult to assure a uniform thickness of the protective film over the entire surface of the disc substrate, even if the operating conditions during application of the protective coating material are adjusted, such that the film thickness on the outer rim of the disc substrate 1 is thicker than that on its inner rim.

FIG. 2 shows the film thickness distribution when the protective film is formed with the viscosity values of the UV curable resin of 500, 140 and 37 cps. In FIG. 2, the ordinate and the abscissa denote the film thickness of the protective film and the radial position from the center of the disc substrate, respectively. In FIG. 2, curves A, B anc C denote measured values of the film thickness of the protective film and the radial position from the center of the disc substrate, when the protective film is formed by a UV curable rein with the viscosity of 500 cps, 140 cps and 37 cps, respectively.

The relation between the film thickness of the protective film and the radial position from the center of the disc substrate, shown in FIG. 1, was measured on a protective film produced by supplying the UV curable resin at a radial position of 17 mm from the center of the disc substrate in a toroidal fashion, increasing the rpm to 3000 over a second, keeping the disc substrate rotating at 3000 rpm for 8 sec and subsequently illuminating the UV rays thereon.

The film thickness of the protective film produced on applying the UV curable resins of different viscosities under the same condition is known to be proportionate to the square root of the viscosity. Thus, the film thickness of the protective film produced from the UV curable resin with the viscosity of 140 cps and that of the protective film produced from the UV curable resin with the viscosity of 500 cps under the same conditions theoretically bear a ratio of $(500/140)^{1/2}=1.9$. Similarly, the film thickness of the protective film produced from the UV curable resin with the viscosity of 37 cps and that of the protective film produced from the UV curable resin with the viscosity of 500 cps under the same conditions theoretically bear a ratio of $(500/37)^{1/2}=3.7$.

FIG. 3 shows a first normalized film thickness distribution, calculated by multiplying the film thickness of the protective film formed of the UV curable resin with the viscosity of 140 cps by 1.9, and a second normalized film thickness distribution, calculated by multiplying the film thickness of the protective film formed of the UV curable resin with the viscosity of 37 cps by 3.7, based on the above-mentioned film thickness ratio. In FIG. 3, the film thickness distribution of the protective film produced from the UV curable resin with the viscosity of 500 cps is indicated by ○, while the first normalized film thickness distribution and the second normalized film thickness distribution are denoted by ∆ and □, respectively.

Referring to FIG. 3, the first normalized film thickness distribution, second normalized film thickness distribution and the film thickness distribution of the protective film formed from the UV curable resin with the viscosity of 500 cps are substantially on the same curve. Therefore, it is seen that the film thickness of the protective film is proportionate to the square root of the viscosity, other conditions being the same.

It is also seen from FIG. 3 that if, with the spin coating method routinely used as a protective film forming method, a protective film is to be formed to a predetermined film thickness, there is produced a film thickness difference of a pre-set value between the film thickness on the inner rim and that on the outer rim of the disc, even if the operating conditions, such as rpm or the rotating time duration, are changed.

It should be noted that the film thickness difference of a pre-set value between the film thickness on the inner rim and that on the outer rim of the disc can be decreased by employing a UV curable resin of low viscosity, lengthening the rotation time duration of the disc substrate and by reducing the film thickness of the applied UV curable resin over the entire surface o the disc substrate. For example, the film thickness difference between the film thickness at a radial position of 24 mm and that at a radial position of 40 mm from the center of the magneto-optical disc can be reduced to approximately the order of 1.5 µm by employing the UV curable resin of 37 cps, lengthening the rotation time duration and by reducing the film thickness of the protective film in its entirety.

However, if the film thickness of the protective film is reduced excessively, it becomes impossible to prevent corrosion of the recording layer of the magneto-optical disc. Therefore, the film thickness of the order of 15 µm on an average at the minimum is required on the entire surface of the protective film. If the average film thickness of the protective film over the entire surface of the magneto-optical disc is 15 µm, a film thickness difference of approximately 5 µm is produced between the inner and outer rims even if the UV curable resin of low viscosity is used and the rotation time duration of the disc substrate is lengthened.

If the film thickness difference is produced between the film thickness on the inner rim and that on the outer rim of the magneto-optical disc in this manner, there is produced wavefront aberration in the laser light illuminated on the recording layer if an optical head in which the laser light is illuminated from the protective film forming surface for recording/reproduction is used. If the wavefront aberration is produced in an optical head due to film thickness difference of the protective film, the laser light illuminated on the recording layer is unstable to deteriorate the recording/reproducing characteristics.

If the refractive index of the protective film is n, the film thickness error of the protective film is ∆d and the numerical aperture of the objective lens used for converging the laser light on the recording layer is NA, the wavefront aberration $W_{4od}$ is given by the following equation (1):

$$W_{4od} = \frac{n^2-1}{8n^3}(NA)^4 \Delta d \qquad (1)$$

With the current magneto-optical disc, the refractive index n of the protective film is 1.58, the laser wavelength λ of the optical system is 780 nm and the numerical aperture of an objective lens is 0.5. If, under this condition, the film thickness error Δd of the protective film is 5 μm, the wavefront aberration $W_{4od}$ is 0.19λ (=0.148 μm), as may be found from the equation 1.

Meanwhile, with the increased recording density in recent years, it is practiced in an optical system for recording/ reproducing a magneto-optical disc to shorten the laser wavelength λ of the optical system and to increase the numerical aperture of the objective lens. This is because the spot diameter of the laser light converged on the recording layer is proportionate to the wavelength λ of the laser light and inversely proportional to the numerical aperture NA of the objective lens.

For example, in the current magneto-optical disc, the laser spot diameter is approximately of the order of 1.6 μm. If, for example, the laser light wavelength is 480 nm and the numerical aperture NA of the objective lens is 0.9, the laser spot diameter is 0.6 μm, so that the spot diameter is approximately one-third of the current laser spot diameter. Thus, if this optical system is used, the surface recording density of the magneto-optical disc can be increased to approximately 9 times that of the disc now in use.

However, if, when there is a film thickness error of the order of approximately 5 μm in the above-described protective film, the optical system of the short wavelength and the high numerical aperture is used, the wavefront aberration $W_{4od}$ calculated from the equation 1 is of a larger value, such that stable recording/reproduction cannot be realized. For example, if, with the wavelength of the laser light beam of 480 nm and with the numerical aperture NA of the objective lens of 0.9, the film thickness error of the protective film is as much as 5 μm, the wavefront aberration $W_{4od}$ is increased significantly, so that stable recording/reproduction cannot be achieved. If, with the optical system of such magneto-optical disc, the wavefront aberration $W_{4od}$ is suppressed at most to the order of 0.19 λ equal to that of the currently used disc, the film thickness difference Δd between the inner and outer rims of the disc needs to be not more than 2.9 μm.

Also, the film thickness difference in the protective film described above affects not only illumination of the laser light by the above-described optical system but also the application of the magnetic field by the magnetic head. Among the types of the magnetic head used in the above-described magnetic field modulation system, there are, for example, a floating type magnetic head recording signals in a state slightly floated by approximately tens of nanometers to tens of micrometers above the protective film of the magneto-optical disc, and a sliding type magnetic head recording signals as it slides over the protective film of the magneto-optical disc. If, in the magnetic field modulation system employing these magnetic heads, there is a film thickness difference in the protective film, the separation between the recording layer and the magnetic head is changed. That is, if, with the use of the floating type magnetic head or the sliding type magnetic head, there is a film thickness difference in the protective film, the separation between the recording layer and the magnetic head is nonuniform to reflect the film thickness difference. Therefore, with the magneto-optical disc employing the floating type magnetic head or the sliding type magnetic head, in particular, it is strongly desired to suppress fluctuations in the film thickness of the protective film to as small a value as possible.

FIG. 4 shows the relation between the magnetic field applied across the recording layer of the magneto-optical disc and the separation between the magnetic head and the recording layer. As may be seen from FIG. 4, if the separation between the magnetic head and the recording layer is varied, there is produced variation in the strength of the magnetic field applied across the recording layer. For example, if, with the use of the floating type magnetic head having a floating height of 5 μm, there is a film thickness difference of 5 μm between the inner and outer rims of the disc, there results a difference in the strength of the applied magnetic field of the order of 15 Oe between the inner and outer rims of the disc.

As a method for suppressing the variation in film thickness, there is proposed a method of forming a protective film as UV light is illuminated on a magneto-optical disc run continuously in rotation at an rpm not less than 1000 rpm. However, it has not been possible with this method to eliminate the variation in the film thickness of the protective film completely such that there is produced a small film thickness difference between the inner and outer rims of the disc.

SUMMARY OF THE INVENTION

It is an object of the present invention to provide a method and apparatus for producing a disc-shaped recording medium in which the difference in the film thickness of a coating film deposited on the disc-shaped recording medium between the inner and outer rims thereof is suppressed to enable the coating film to be formed to a uniform film thickness over the entire substrate surface.

The first manufacturing apparatus for a disc-shaped recording medium according to the present invention includes a turntable and a rotary disc. The turntable, on which is set a disc-shaped recording medium having a center opening, is adapted for rotating the disc-shaped recording medium, and has a recess in its mid portion. The rotary disc has a disc portion which includes a tapered portion gradually increased in diameter from the outer rim towards the inner rim and which at least covers the center opening of the disc-shaped recording medium, and a center shaft provided at a mid portion of the disc portion. The disc portion has the outer peripheral edge contacted with the disc-shaped recording medium when the center shaft of the rotary disc is inserted into the recess formed in the turntable on which is set the disc-shaped recording medium. There is formed a gap between the inner rim of the disc portion and the disc-shaped recording medium. A coating liquid is supplied to the center portion of the disc-shaped recording medium and the rotary disc when the center shaft of the rotary disc is inserted into the recess formed in the turntable on which is set the disc-shaped recording medium and both the disc-shaped recording medium and the rotary shaft are rotated. The coating liquid is extended by the centrifugal force by such rotation to form a coating film on the disc-shaped recording medium.

If, when forming a coating film by the spin coating method, the coating liquid supply start position is offset from the center of rotation of a material being coated, there is produced variation in the film thickness of the coating film, such that the film thickness of the outer rim portion becomes larger than that of the inner rim portion. For suppressing this variation in the film thickness, it suffices if the coating liquid supply start position is the center of rotation of the material being coated. However, the disc-shaped recording medium usually has a center opening. In the case of the disc-shaped recording medium having a center opening, the coating liquid cannot be supplied to the center of rotation.

Thus, in the first manufacturing apparatus for a disc-shaped recording medium according to the present invention, the center opening of the disc-shaped recording medium is stopped by the rotary disc in order to supply the coating liquid to a center portion of the disc-shaped recording medium and the rotary disc. That is, with the present manufacturing apparatus for a disc-shaped recording medium, it is possible to suppress the variation in the film thickness of the protective film.

However, if simply the center opening of the disc-shaped recording medium is stopped by a rotary disc, it is feared that the coating liquid is intruded into the space between the rotary disc and the disc-shaped recording medium by the capillary phenomenon. Therefore, in the first manufacturing apparatus for a disc-shaped recording medium according to the present invention, there is defined a gap between the inner rim of the disc portion of the rotary disc and the disc-shaped recording medium. If a sufficient gap is provided between the inner rim of the disc portion of the rotary disc and the disc-shaped recording medium, it is possible to prohibit the coating liquid from entering the space between the rotary disc and the disc-shaped recording medium by the capillary phenomenon.

A second manufacturing apparatus for a disc-shaped recording medium according to the present invention includes a turntable and a rotary disc. The turntable, on which is set a disc-shaped recording medium having a center opening, is adapted for rotating the disc-shaped recording medium, and has a recess in its mid portion. The rotary disc has a disc portion which includes a tapered portion gradually increased in diameter from the outer rim towards the inner rim and which at least covers the center opening of the disc-shaped recording medium, and a center shaft provided at a mid portion of the disc portion. An ejection opening provided in the center shaft of the rotary table for ejecting a gas. A coating liquid is supplied to the center portion of the disc-shaped recording medium and the rotary disc when the center shaft of the rotary disc is inserted into the recess formed in the turntable on which is set the disc-shaped recording medium, and both the disc-shaped recording medium and the rotary shaft are rotated. The coating liquid is extended by the centrifugal force by the rotation to form a coating film on the disc-shaped recording medium. The gas is injected via the ejection opening to a space between the disc portion of the rotary disc and the disc-shaped recording medium when the rotary disc is dismounted from the turntable.

In the second manufacturing apparatus for a disc-shaped recording medium according to the present invention, similarly to the first manufacturing apparatus, the center opening of the disc-shaped recording medium is stopped by the rotary disc in order to supply the coating liquid to the center portion of the disc-shaped recording medium and the rotary disc. It is thus possible to suppress variation in the film thickness of the coating film. Moreover, since a gas is ejected to a space between the disc portion of the rotary disc and the disc-shaped recording medium when the rotary disc is dismounted from the turntable, the coating liquid can be prohibited from entering the space between the disc portion and the disc-shaped recording medium.

The manufacturing method for a disc-shaped recording medium according to the present invention includes setting a disc-shaped recording medium having a center opening on a turntable, covering at least the center opening of the disc-shaped recording medium by a rotary disc having a disc portion having a diameter larger than the diameter of the center opening, and supplying a coating liquid to the center portion of the disc-shaped recording medium and the rotary table as the disc-shaped recording medium and the rotary table are rotated by the turntable. The coating liquid is extended by the centrifugal force by this rotation to form a coating film on the disc-shaped recording medium. The gas is injected via the ejection opening to a space between the disc portion of the rotary disc and the disc-shaped recording medium when the rotary disc is dismounted from the turntable.

In the manufacturing method for a disc-shaped recording medium according to the present invention, the center opening of the disc-shaped recording medium is stopped by the rotary disc in order to supply the coating liquid to the center portion of the disc-shaped recording medium and the rotary disc. It is thus possible to suppress variation in the film thickness of the coating film. Moreover, since a gas is ejected to a space between the disc portion of the rotary disc and the disc-shaped recording medium when the rotary disc is dismounted from the turntable, the coating liquid can be prohibited from entering the space between the disc portion and the disc-shaped recording medium.

Also, a third manufacturing apparatus for a disc-shaped recording medium according to the present invention includes a rotary shaft portion, a rotary disc unit and coating liquid supplying means. The rotary shaft has a flange on one end for supporting the disc-shaped recording medium and a recess at the center of the flange opened to the flange forming end. The rotary disc unit has a disc portion covering the center opening of the disc-shaped recording medium and a center shaft whose one end is connected to the disc portion and which is fitted in the recess of the rotary shaft portion. The coating liquid supply means furnishes the coating liquid to the disc-shaped recording medium supported on the flange of the rotary shaft portion. With the present manufacturing apparatus for the disc-shaped recording medium, at least the bottom side of the recess of the rotary shaft portion is formed of magnetic metal and at least the distal end of the center shaft of the rotary disc unit is formed by a magnet.

In the third manufacturing apparatus for a disc-shaped recording medium according to the present invention, the disc-shaped recording medium can be supported, with the disc portion of the rotary disc unit stopping up the center opening of the disc-shaped recording medium, by fitting the center shaft of the rotary disc unit in the recess of the rotary shaft portion and by clinching the disc-shaped recording medium by the flange of the rotary shaft portion and the rotary disc portion. The latter is run in rotation in this state to supply the coating liquid by the coating liquid supply means. Since the center opening of the disc-shaped recording medium is stopped up by the disc portion of the rotary disc unit, the coating liquid can be supplied to the center portion of the disc-shaped recording medium. Moreover, with the third manufacturing apparatus for a disc-shaped recording medium according to the present invention, in which at least the bottom side of the recess of the rotary shaft portion is formed of magnetic metal and at least the distal end of the center shaft of the rotary disc unit is formed by a magnet, the recess of the rotary shaft portion can be strongly linked to the center shaft of the rotary disc unit.

Meanwhile, in the third manufacturing apparatus for a disc-shaped recording medium according to the present invention, it is desirable that a coil is arranged on the rotary shaft portion and an electromagnet is constituted by the magnetic metal portion of the rotary shaft portion and the coil. If the electromagnet is constituted in this manner, the center shaft of the rotary disc unit can be mounted on and dismounted from the recess of the rotary shaft portion.

It is also desirable that, if the electromagnet is constituted as described above, a magnetic field opposite in direction to the magnetic field of the magnet of the center shaft of the rotary disc unit is generated by allowing the current to flow in the coil of the electromagnet. This assures facilitated mounting and dismounting of the rotary shaft portion of the center shaft of the rotary disc unit.

It should be noted that if, in the method and apparatus for manufacturing the disc-shaped recording medium according to the present invention, the disc-shaped recording medium as the material for coating is such a recording medium in which the groove is formed on a radially inner side with respect to the recording area adapted for recording the information, the outer diameter of the disc portion stopping up the center opening is larger than the outer diameter of the groove. If the outer diameter of the disc portion stopping up the center opening is larger than the outer diameter of the groove, the coating liquid can be prevented from entering the groove. Meanwhile, this groove is formed by transcription to the substrate of the profile of a retention member used for securing the stamper for molding a substrate.

The method and apparatus for manufacturing the disc-shaped recording medium according to the present invention are applied when forming a protective film used for protecting e.g., the recording layer of the disc-shaped recording medium. In particular, the present method and apparatus for manufacturing the disc-shaped recording medium are effective for forming a protective film for the disc-shaped recording medium in which the information is recorded and/or reproduced on illumination of the laser light from the side of the protective film. In the case of the disc-shaped recording medium in which the laser light is illuminated from the side of the protective film, it is required strongly to suppress the variation in the film thickness of the protective film. Thus, the present method and apparatus for manufacturing the disc-shaped recording medium, capable of suppressing the variation in film thickness of the coating film, is particularly suited for forming the protective film for this type of the disc-shaped recording medium.

Since the center opening of the disc-shaped recording medium is stopped up by the rotary disc according to the present invention, the coating liquid can be supplied to the center of rotation of the recording medium when forming the coating film by the spin coating method on the disc-shaped recording medium. Thus, according to the present invention, the film thickness difference between the film thickness of the inner rim and that on the outer rim of the recording medium can be eliminated to produce a uniform coating film on the entire surface of the recording medium. The result is that a disc-shaped recording medium can be produced which has the protective film of the uniform film thickness formed thereon.

If the outer rim of the disc portion of the rotary disc unit is contacted with the disc-shaped recording medium and a gap is formed between the disc unit and the disc-shaped recording medium, in accordance with the present invention, the coating liquid is not liable to be intruded by the capillary phenomenon to a space between the disc unit and the disc-shaped recording medium. Thus, if the coating film forming operation is repeated on different disc-shaped recording mediums, the coating film can be formed without contaminating the disc portion or the disc-shaped recording medium.

Also, if, when dismounting the rotary disc from the turntable, a gas is ejected to a space between the disc portion of the rotary disc unit and the disc-shaped recording medium, in accordance with the present invention, the coating liquid can be prevented form being intruded into a space between the disc unit and the disc-shaped recording medium. Thus, if the coating film forming operation is repeated on different disc-shaped recording mediums, the coating film can be formed without contaminating the disc portion or the disc-shaped recording medium.

Moreover, if at least the bottom side of the recess of the rotary shaft portion is formed of magnetic metal, and at least the distal end of the center shaft of the rotary disc unit is formed by a magnet, the center shaft of the rotary disc unit can be strongly fitted in the recess of the rotary shaft portion. Thus, the coating film can be formed in stability without producing vibrations of the center shaft of the rotary disc unit.

In addition, if the coil is mounted on the rotary disc unit and the electromagnet is constituted by the magnetic metal portion of the rotary shaft and the coil, the center shaft of the rotary disc unit can be mounted on or dismounted from the recess of the rotary shaft portion by the magnetic force produced by adjusting the direction of the magnetic field from the magnet. Further, if the magnetic field opposite in direction to the magnetic field of the magnet on the center shaft of the rotary disc unit, the center shaft of the rotary disc unit can be easily mounted on or dismounted from the recess of the rotary shaft portion. If the current is allowed to flow in the coil of the electromagnet to produce a magnetic field opposite in direction to that of the magnet of the center shaft of the rotary disc unit, the center shaft of the rotary disc unit can be easily mounted on or dismounted from the recess of the rotary shaft portion.

EMBODIMENTS OF THE INVENTION

Figure 1:
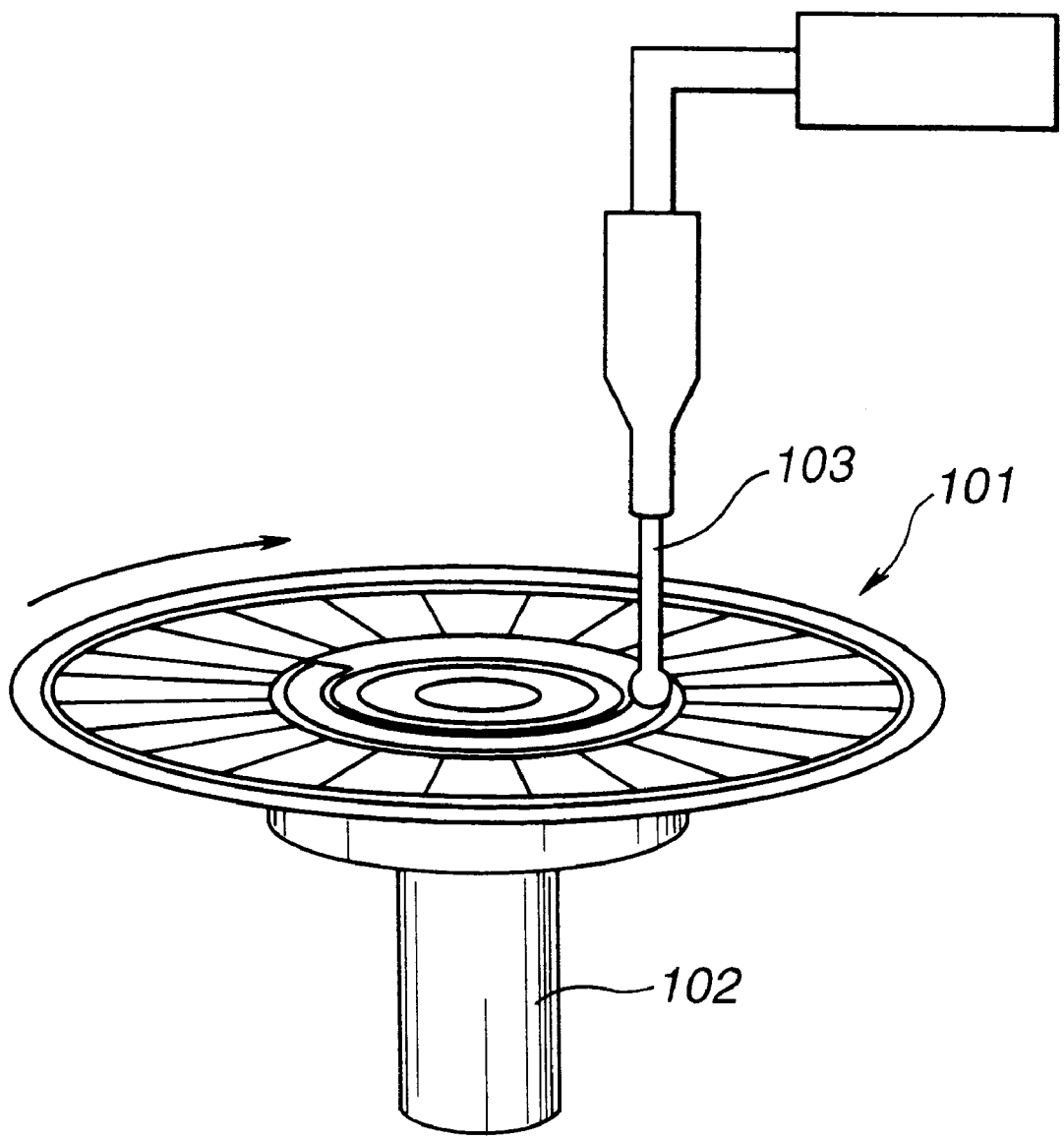
FIG. 1 is a perspective view showing how a protective film is formed on a disc substrate by a conventional method.
Figure 2:
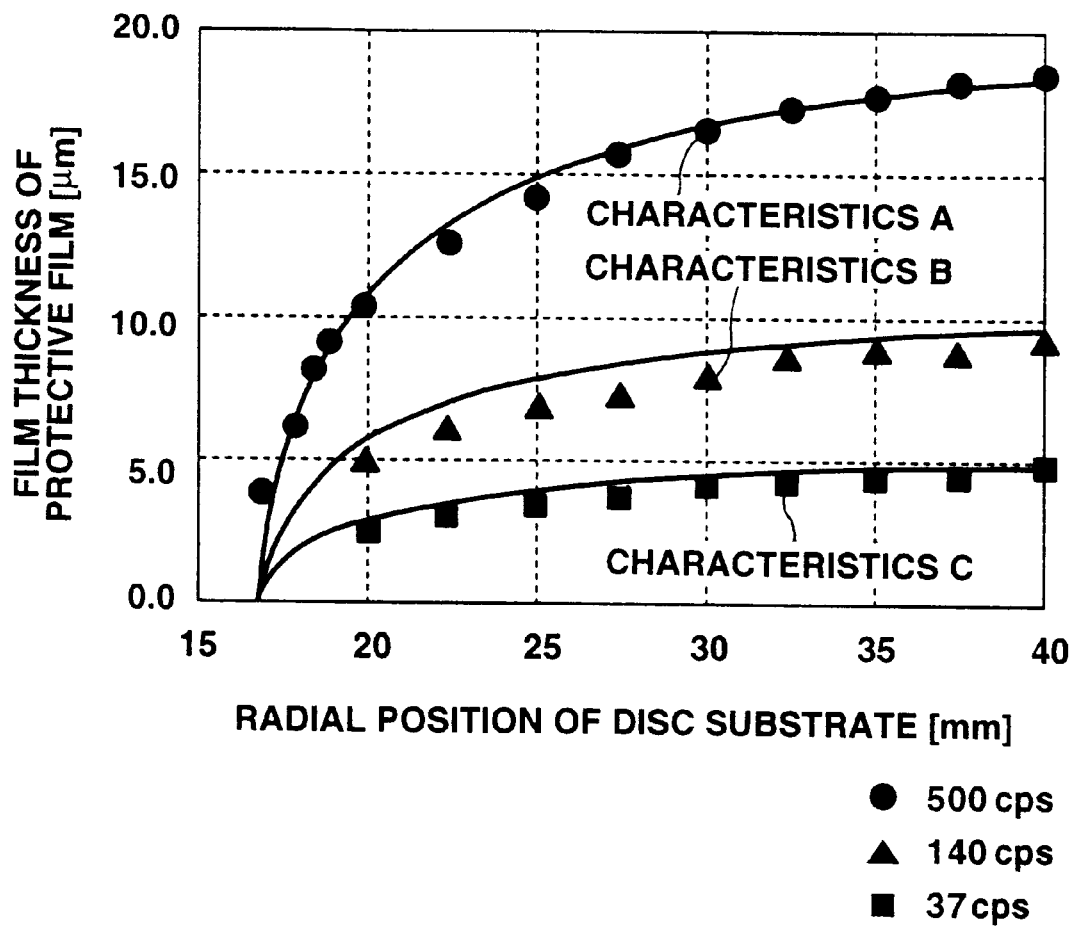
FIG. 2 shows the relation between the radial position of a disc substrate and the film thickness of a protective film of a disc substrate for different values of the viscosity of the UV curable resin in case the protective film is formed on the disc substrate by the conventional method.
Figure 3:
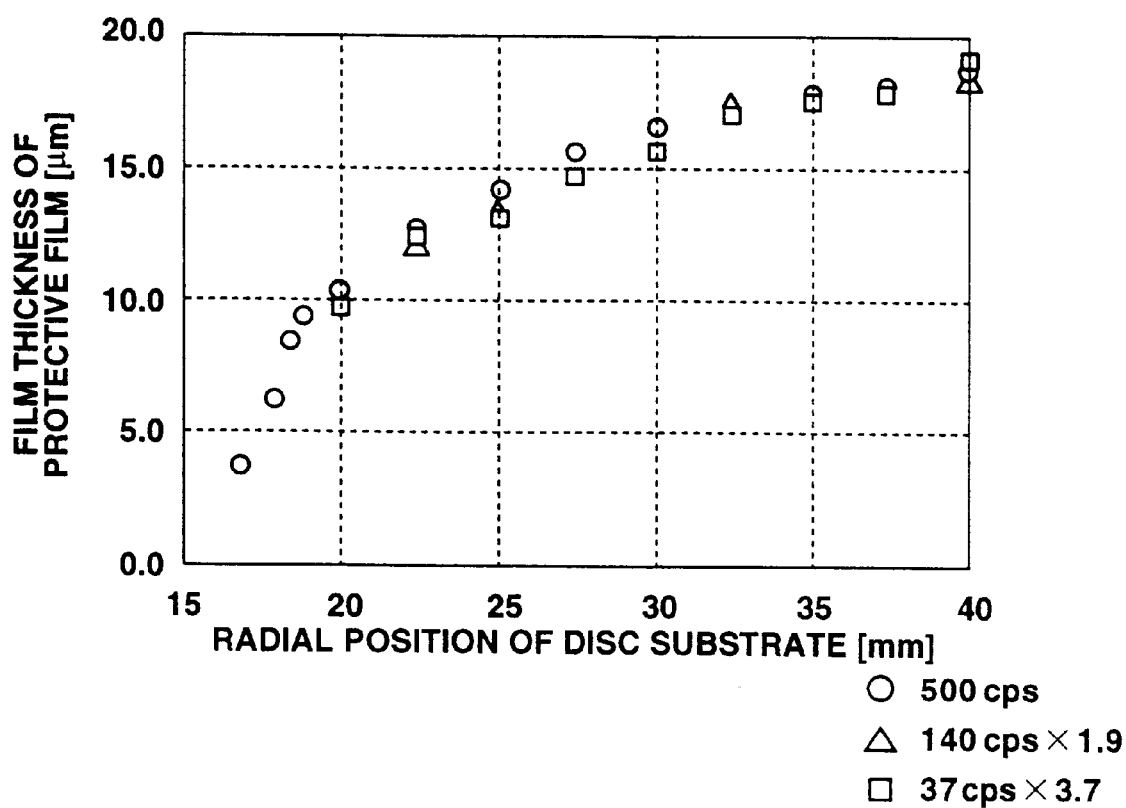
FIG. 3 shows the normalized film thickness distribution in case the protective film is formed on the disc substrate by the conventional method.
Figure 4:
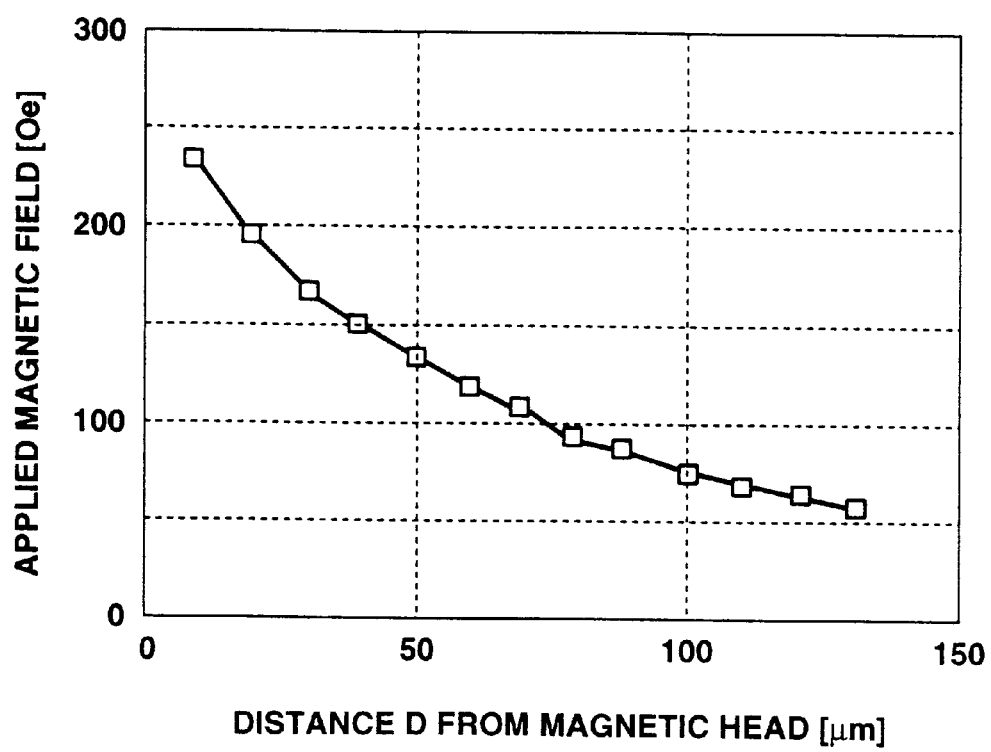
FIG. 4 shows the relation between the distance between the magnetic head and the magneto-optical disc and the magnetic field applied across the magneto-optical disc.

Referring to the drawings, preferred embodiments of the present invention will be explained in detail. In the following explanation, it is assumed that a magneto-optical disc for recording/reproducing signals by a magnetic field modulation system is manufactured. An embodiment in which the present invention is applied for forming a protective film formed of a UV curable resin on a disc substrate, on the major surface of which a recording layer has been formed, is hereinafter explained.

First Embodiment

Figure 5:
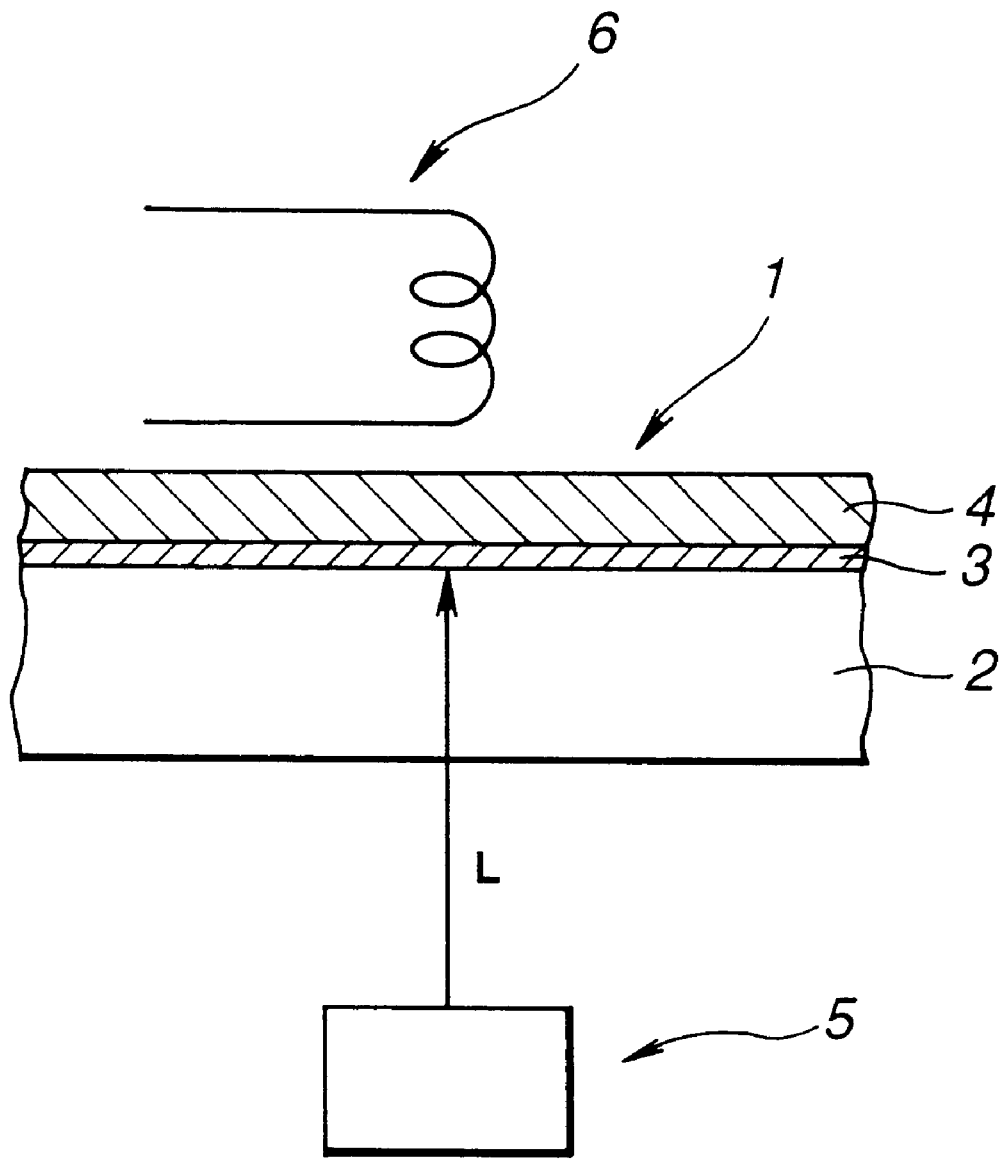
FIG. 5 shows the relation between the cross-sectional structure of a magneto-optical disc and the relation between the magneto-optical disc on one hand and the optical head or the magnetic head on the other hand.

A magneto-optical disc 1 manufactured in the present embodiment is a magneto-optical disc for recording/reproduction in accordance with the magnetic field modulation system. Referring to FIG. 5, a recording layer 3 is formed on a disc substrate 2 and a protective film 4 for protecting the recording layer 3 is formed on the recording layer 3.

During recording/reproduction, an optical head 5 and a magnetic head 6 are arranged on the side of the disc substrate 2 and on the side of the protective film 4 of the magneto-optical disc 1, respectively. During recording of information signals, a laser light beam is illuminated from the side of the disc substrate 2 by the optical head 2, at the same time as a magnetic field modulated in accordance with recording information signals is applied by the magnetic head 6 from the side of the protective film 4.

In this magneto-optical disc 1, the disc substrate 2 os a disc-shaped transparent substrate having a thickness of a few mm. The disc substrate 2 is formed of plastics, such as acrylic resin, polycarbonate resin, polyolefin resin or epoxy resin, or a vitreous material.

The recording layer 3 is formed on the disc substrate 2 and is formed toroidally in a radial range of 24 to 40 mm from the center of the disc substrate 2. On the recording layer 3 are layered a first dielectric film, a recording magnetic film for recording information signals, a second dielectric film and a light reflective film.

The recording magnetic film is constituted by a thin amorphous magnetic film having an easy axis perpendicular to the film surface. This recording magnetic film is desirably not only superior in photomagnetic properties but also has large coercivity at room temperature and a Curie point in the vicinity of 200° C. This recording magnetic film is formed of, for example, a rare earth-transition metal amorphous thin film. More specifically, the recording magnetic film is an amorphous thin film of the TbFeCo system. The recording magnetic film is improved in corrosion resistance by addition of elements such as Cr to the recording magnetic film.

As the first and second dielectric films, a variety of oxides or nitrides may be used. If oxides are used, oxygen in the dielectric film tens to affect the recording magnetic film. Therefore, nitrides are more desirable. The material of the dielectric film is preferably such a material capable of inhibiting transmission of oxygen and water molecules and sufficiently transmitting the laser light in use. Specifically, silicon nitride or aluminum nitride is preferred.

The light reflective film is preferably a film of a high reflectance material capable of reflecting not less than 70% of the laser light on its boundary to the second dielectric film. A vaporized film of a non-magnetic material is preferred. This light reflective film is desirably of a thermally good conductive material and is preferably of aluminum in view of availability.

The recording magnetic film, first and second dielectric films and the reflective film are formed by the so-called vapor-phase plating method, such as evaporation or sputtering. Although the film thicknesses of the respective layers can be set optionally, the film thicknesses are usually set to hundreds to thousands of angstroms. The film thicknesses of the respective layers are desirably set taking into account not only the optical properties of the respective layers but also the effect derived from combination of the different layers. The reason is that the light transmitted through the recording magnetic films so as to be reflected on the boundaries of the respective layers undergo multiple interference such that the effective optical properties and photomagnetic properties of the recording magnetic film are varied significantly by the film thickness combinations.

The protective film 4 is formed on the recording layer 3 having the above structure and is formed of, for example, a UV curable resin. This protective film 4 is formed by the spin coating method described above. The protective film 4 is formed to an average film thickness of not less than approximately 15 μm on the entire surface of the protective film 4. By setting the average film thickness of the protective film 4 to not less than approximately 15 μm, it becomes possible to prevent corrosion of the recording layer 3 sufficiently. By forming the protective film 4 in accordance with the present invention as now explained in detail, the film thickness difference across the inner and outer rims of the magneto-optical disc 1 can be decreased to not more than approximately 2 μm.

This protective film 4 is applied to the entire surface of the disc substrate 2, carrying the recording layer 3, by supplying a UV curable resin to the disc substrate carrying the recording layer 3 and running the disc substrate 2 in rotation for spreading the UV curable resin by the centrifugal force produced on rotation. In the following description, the disc substrate 2, carrying the recording layer 3, is simply termed a disc substrate 7.

Figure 6:
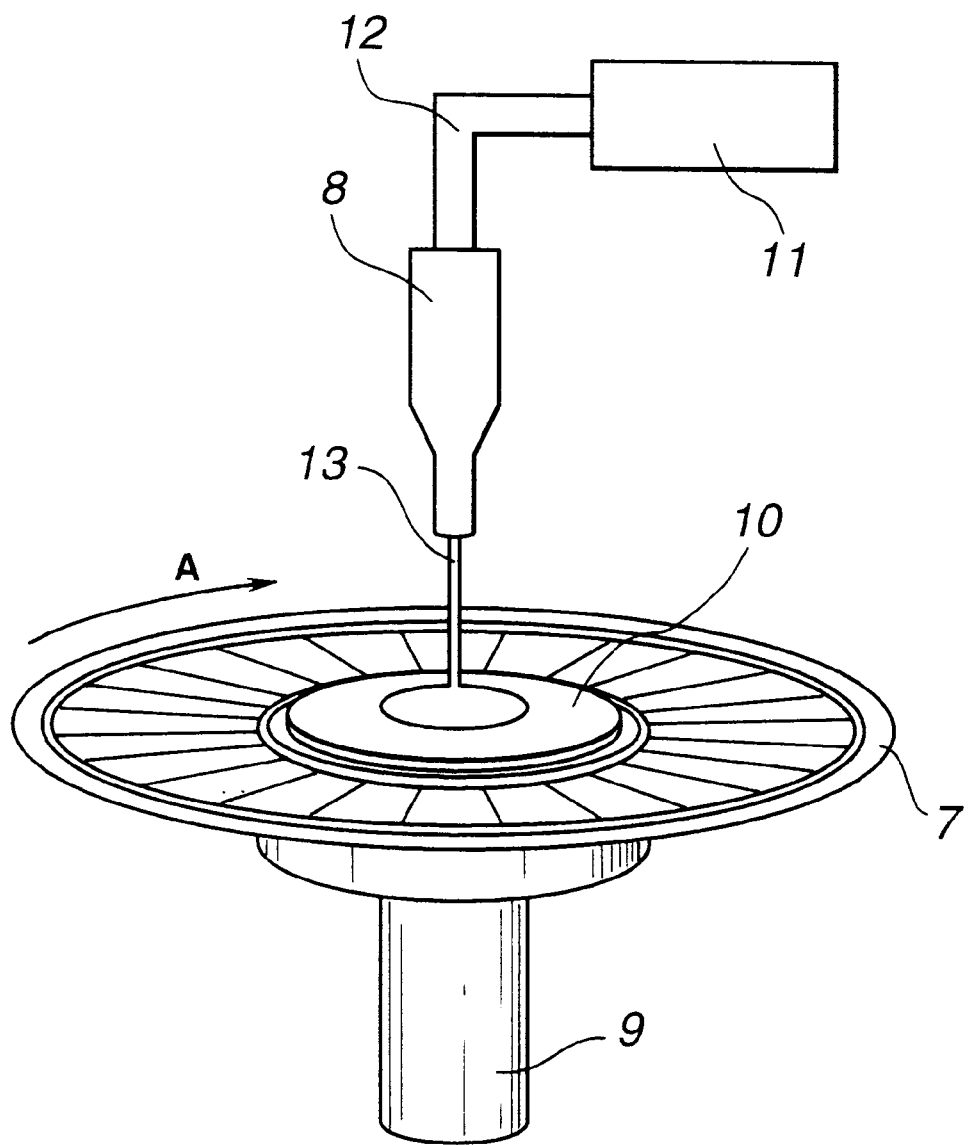
FIG. 6 is a schematic perspective view showing essential portions of an illustrative structure of a protective film forming device according to the present invention.

FIG. 6 shows a protective film forming device for forming the protective film 4 on the magneto-optical disc 1. This protective film forming device is typical of the producing devices for producing a disc-shaped recording medium according to the present invention and includes a nozzle 8, a turntable 9 and a rotary disc 10.

The nozzle 8 is mounted on one end of a resin supply tube 12 connected to a resin supply unit 11. During spin coating, the nozzle 8 is placed directly above a rotary disc 10 operating as the center of rotation of the disc substrate 7 and the rotary disc, and ejects the UV curable resin 13 to the center of rotation of the disc substrate 7 and the rotary disc 10.

Figure 7:
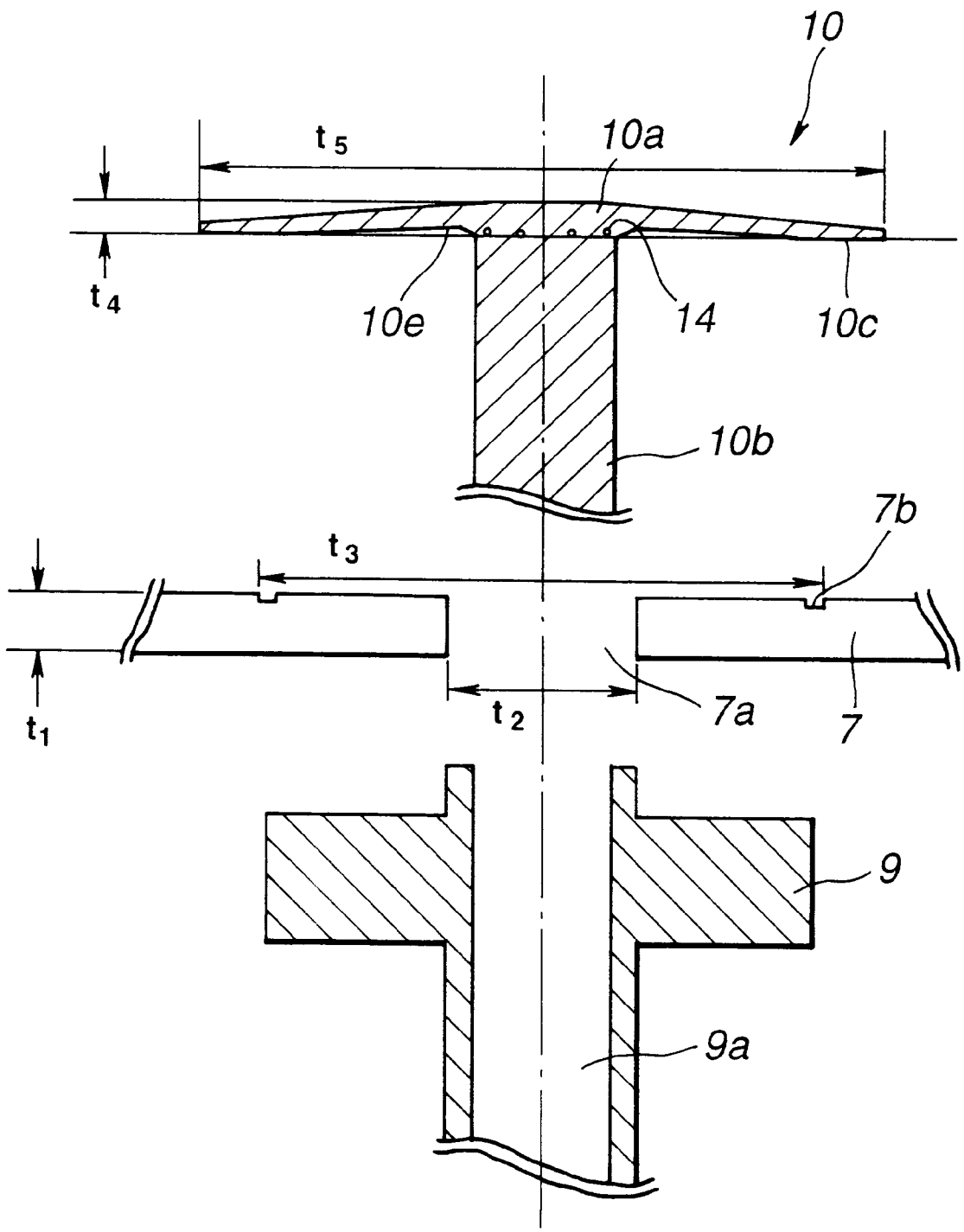
FIG. 7 is an exploded schematic cross-sectional view showing the structure of the protective film forming device shown in FIG. 6.

FIG. 7 shows the cross-section of the turntable 9, disc substrate 7 and the rotary disc 10.

The turntable 9, adapted to set the disc substrate 7 thereon, rotates the disc substrate 7 during spin coating in the direction indicated by arrow A in FIG. 6. The turntable 9 runs the disc substrate 7 at a predetermined rpm by rotational driving means, such as a spindle motor. In the turntable 9 is formed a center opening 9a in which is inserted a center shaft 10b of the rotary disc 10.

The disc substrate 7, on which is formed the protective film 4, has, for example, an outer diameter of 86 mm, a thickness t1 of 15 mm and a diameter t2 of the center opening 7a of 15 mm. The disc substrate 7 is formed with a retention groove 7b having the profile of a retention member for securing a substrate molding stamper transcribed therein during molding of the substrate by injection molding. This retention groove 7b is formed in a radially inner portion than a data area in which to record information signals and has an outer diameter t3 of, for example, 34 mm.

Figure 8:
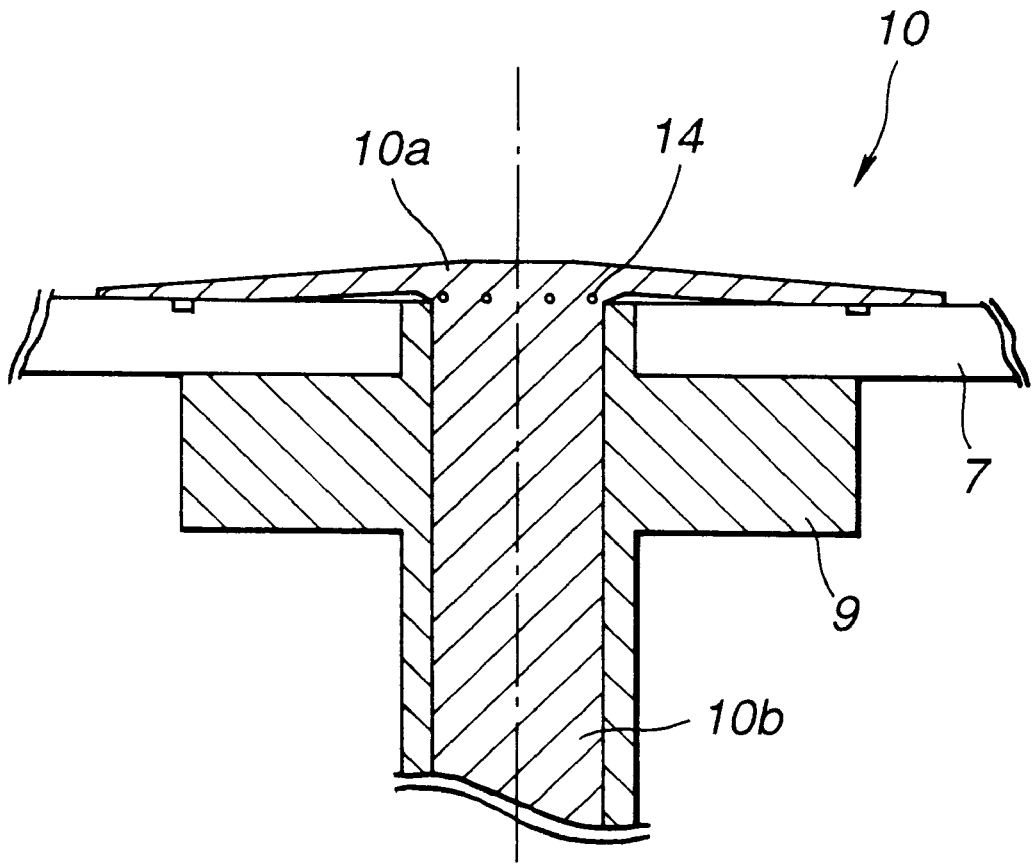
FIG. 8 is a cross-sectional view showing the state in which, in the protective film forming device shown in FIG. 6, a disc substrate and a rotary disc are set on a turntable.

FIG. 8 shows, in cross-section, the state in which the disc substrate 7 is set on the turntable 9 and the rotary disc 10 is arranged on the disc substrate 7.

This rotary disc 10 can be mounted on or detached from the center opening 9a of the turntable 9. When the protective film 4 is formed by the spin coating method on the disc substrate 7, the rotary disc 10 has its center shaft 10b inserted and secured in the center opening 7a of the disc substrate 7 and in the center opening 9a of the turntable 9 so that the disc portion 10a overlies the center opening 7a and the inner rim of the disc substrate 7.

The protective film forming device, configured as described above, has a rotary disc 10 which is inserted into the center opening 7a of the disc substrate 7, so that a coating film of the UV curable resin 13 can be produced with the center opening 7a of the disc substrate 7 closed. In other words, the protective film forming device can furnish the UV curable resin 13 to the center of rotation of the disc substrate 7 during spin coating.

If at this time the entire disc portion 10a of the rotary disc 10 is in contact with the disc substrate 7, the UV curable resin 13 is intruded into a space between the disc portion 10a and the disc substrate 7 by the capillary effect when dismounting the rotary disc 10 from the center opening 9a of the turntable 9 such that the UV curable resin 13 tends to be deposited on the contact surface of the disc portion 10a with the disc substrate 7. If the UV curable resin 13 is deposited on the contact surface of the disc portion 10a with the disc substrate 7, the inner rim portion of the disc substrate is contaminated by the UV curable resin 13 deposited on the contact surface of the disc portion 10a with the disc substrate 7.

This is due to the fact that, when dismounting the rotary disc 10 from the center opening 9a of the turntable 9, the capillary phenomenon occurs between the disc portion 10a and the disc substrate 7 such that the UV curable resin 13 is intruded into the space between the disc portion 10a and the disc substrate 7. In particular, if the rotary disc 10 is formed of a material having high surface tension, such as aluminum, the UV curable resin 13 tends to be intruded into the space between the disc portion 10a and the disc substrate 7 due to increased wettability of the rotary disc 10.

Figure 9:
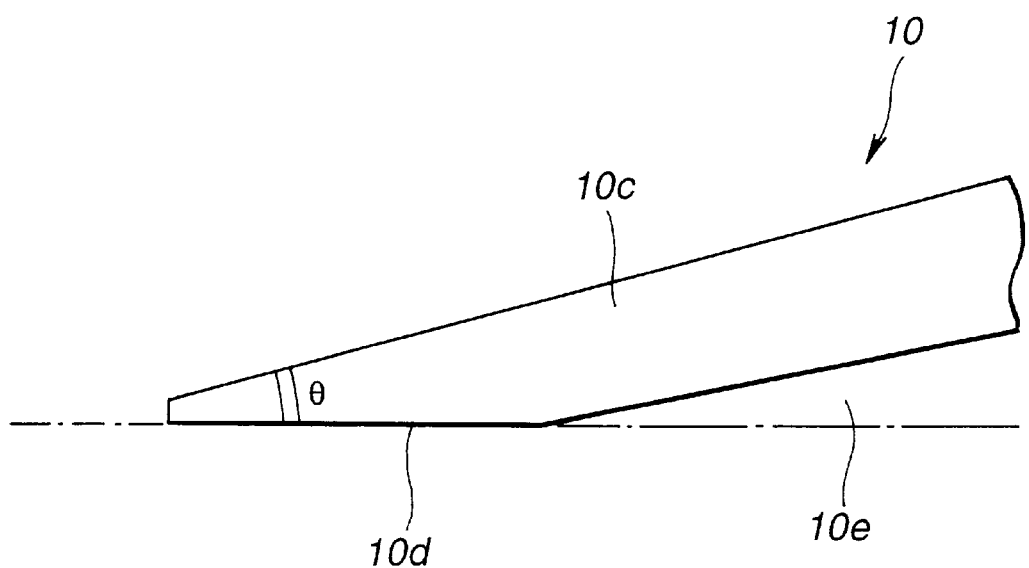
FIG. 9 shows, to an enlarged scale, a tapered portion formed on the outer rim of the disc in the protective film forming device shown in FIG. 6.

Thus, in the protective film forming device according to the present invention, the outer rim of the disc portion 10a is formed with a tapered portion 10c, as shown in FIG. 9. This tapered portion 10c is formed at a predetermined angle θ with respect to the protective film forming surface of the disc substrate 7 so that the tapered portion 10c is progressively increased in diameter from the outer rim to the inner rim of the disc substrate 7. The outer rim of the tapered portion 10c of the rotary disc 10 operates as a contact surface 10d with the disc substrate 7, with a gap 10e being formed between the inner rim of the disc portion 10a and the disc substrate 7. The capillary phenomenon can be prohibited by providing the tapered portion 10c on the outer rim of the disc portion 10a for reducing the contact area between the disc portion 10a and the disc substrate 7. In other words, since the gap 10e is defined between the disc portion 10a and the inner rim of the disc substrate 7, there is no risk of the UV curable resin 13 entering more inwardly than the contact surface 10d between the disc portion 10a and the disc substrate 7 due to the capillary phenomenon.

Moreover, since the retention groove 7b is formed in the disc substrate 7, the UV curable resin 13 tends to be deposited in the retention groove 7b on applying the UV curable resin. Thus, the diameter of the disc portion 10a is desirably larger than the outer diameter of the retention groove 7b. The UV curable resin 13 can be prohibited from being deposited in the retention groove 7b by the disc portion 10a having a diameter larger than the outer diameter of the retention groove 7b so that the disc portion 10a overlies the retention groove 7b.

The contact surface 10d of the disc portion 10a with the disc substrate 7 is preferably formed of a material having surface tension smaller than that of the UV curable resin 13. By having the contact surface 10d of the disc portion 10a with the disc substrate 7 formed of a material lower in surface tension than the UV curable resin 13, it becomes difficult for the UV curable resin 13 to enter the contact surface 10d of the disc portion 10a with the disc substrate 7. Meanwhile, aluminum has a surface tension of approximately 37 dyne/cm. It is noted that the UV curable resin 13 used in the protective film forming device of the present invention has a surface tension of approximately 30 dyne/cm.

Thus, the contact surface 10d of the rotary disc 10 with the disc substrate 7 is processed with fluorine resin. As the fluorine resin, polytetrafluoroethylene, for example, is preferred. By processing with fluorine resin, the surface tension of the contact surface 10d of the rotary disc 10 with the disc substrate 7 can be reduced to approximately 20 dyne/cm which is smaller than the surface tension of the disc substrate 7.

If the surface tension of the contact surface 10d of the rotary disc 10 with the disc substrate 7 is made lower in this manner than that of the UV curable resin 13 by processing with fluorine resin, the UV curable resin 13 having the surface tension of approximately 25 to 40 dyne/cm is repelled such that there is substantially no risk of the UV curable resin 13 being deposited on the contact surface 10d of the rotary disc 10 with the disc substrate 7.

The center shaft 10b is preferably formed with at least one ejection opening 14 for permitting a gas to be ejected from the center shaft 10b towards outside when the rotary disc 10 is dismounted from the turntable 9 after forming the coating film of the UV curable resin 13 on the disc substrate 7. If the protective film forming device is provided with the ejection opening 14, the gas is ejected via the ejection opening 14 to outside when dismounting the rotary disc 10 from the turntable 9 after forming the disc substrate 7 on the coating film of the UV curable resin 13 on the disc substrate 7 for prohibiting the UV curable resin 13 from entering the space between the rotary disc 10 and the disc substrate 7. Thus, there is no risk of the UV curable resin 13 from being deposited on the contact surface of the rotary disc 10 with the disc substrate 7 such that the protective film 4 can be formed on the next disc substrate without the risk of contaminating the inner rim portion of the disc substrate.

The configuration of the ejection opening 14 is not limited to that shown in FIGS. 7 or 8. That is, similar effects may be realized by a configuration of allowing the gas to be ejected from the center shaft 10b of the rotary disc 10 towards outside.

The protective film forming method for forming the protective film 4 on the disc substrate 7 by the above-described protective film forming device is hereinafter explained.

For forming the protective film 4 on the disc substrate 7, the UV curable resin 13 is first supplied from the nozzle 10 onto the center of rotation of the rotary disc 10, as shown in FIG. 6. The UV curable resin 13 used is of the viscosity of the order of 500 cps. The disc substrate 7 and the rotary disc 10 are set on the turntable 9 and, in this state, the turntable 9 is rotated at a low rpm of the order of approximately 30. This rotates the disc substrate 7 and the rotary disc 10 set on the turntable 9 at the same speed as the turntable 9. In this manner, the UV curable resin 13 is spread on the disc substrate 7 by first rotating the disc substrate 7 and the rotary disc 10 at a low rpm.

The rpm of the turntable 9 is increased to 3000 over one sec. The rotating state at 3000 rpm is then maintained for eight sec so that the UV curable resin 13 supplied to the center of rotation of the rotary disc 10 is sufficiently spread to the outer rim portion of the disc substrate 7 by the centrifugal force to form a coating film of the UV curable resin 13 on the entire surface of the disc substrate 7 to a substantially uniform film thickness.

After forming the coating film of the UV curable resin 13 on the disc substrate 7, the center shaft 10b of the rotary disc 10 is taken out from the center opening 9a of the turntable 9 in order to set the next disc substrate on the turntable 9. At this time, a gas is ejected via the ejection opening 14 to outside, when dismounting the rotary disc 10 from the turntable 9, for preventing the UV curable resin 13 deposited on the rim portion of the rotary disc 10 towards the contact surface of the rotary disc 10 by the capillary phenomenon. By ejecting the gas via the ejection opening 14 towards outside, the UV curable resin 13 is prevented from entering the space between the rotary disc 10 and the disc substrate 7 by the capillary phenomenon to prevent the UV curable resin 13 from being deposited on the contact surface of the rotary disc 10 with the disc substrate 7. Thus, there is no risk contamination of the inner rim of the disc substrate when forming a protective film on the next disc substrate.

The protective film 4 is formed on the disc substrate 7 by illuminating UV rays on the coating film of the UV curable resin 13 formed on the disc substrate for curing the resin.

Figure 10:
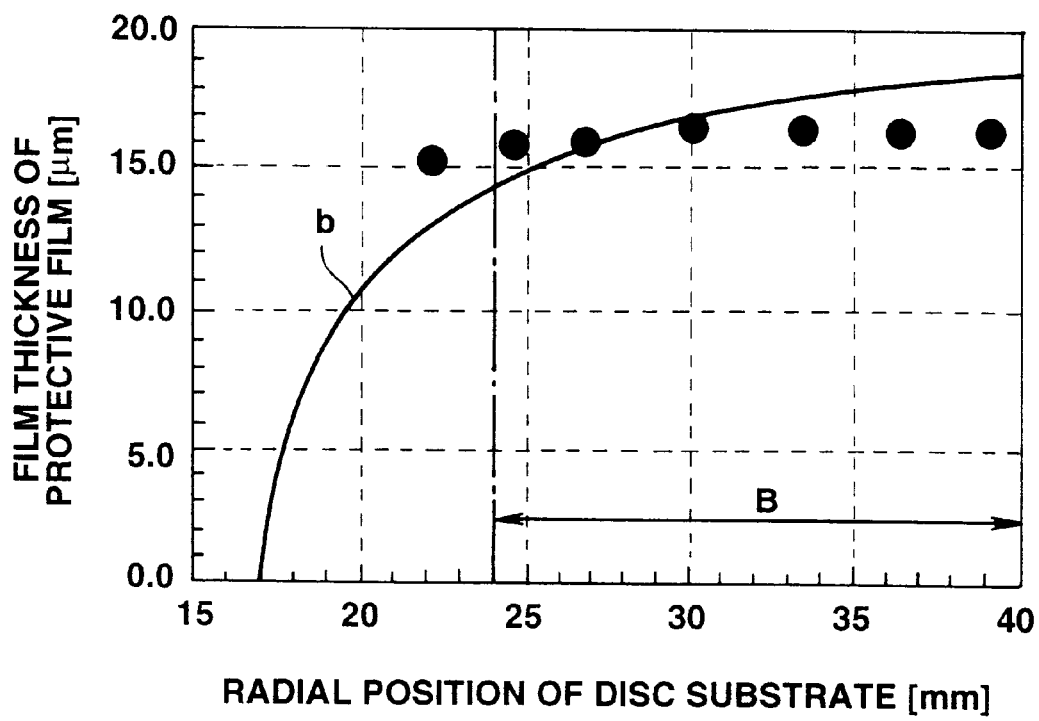
FIG. 10 shows the relation between the radial position of the disc substrate and the film thickness of the protective film.

FIG. 10 shows the results of measurement of the film thickness of the protective film 4 formed by the above-described protective film forming method. In FIG. 10, the abscissa ands the ordinate represent the radial position from the center of the disc substrate 7 and the film thickness of the protective film 4 at the radial position from the center of the disc substrate 7, respectively. In FIG. 10, the film thickness of the protective film formed by the protective film forming method of the present invention is indicated by ●, while the theoretical values of the film thickness distribution when forming the protective film on rotating the disc substrate by the conventional method are indicated by solid lines, by way of a comparative example.

Meanwhile, the range of the recording layer 3 formed on the disc substrate 7 actually used is from the radial position of approximately 24 mm to the radial position of approximately 40 mm of the disc substrate 7. Specifically, this area is an area on which to form the protective film 4.

Referring to FIG. 10, the film thickness of the protective film 4 formed by the protective film forming method of the present invention as described above is approximately 16 μm within the radial area of 24 mm to 40 mm of the disc substrate 7. The variation of the film thickness of the protective film is not larger than approximately 2.0 μm within the range of the radial positions of approximately 24 mm to approximately 40 mm. On the other hand, with the comparative example in FIG. 6, the film thickness tends to be thicker from the inner rim towards the outer rim of the disc substrate over the entire area of the disc substrate, such that the film thickness of the protective film is thicker on the outer rim side of the disc substrate even within a range of approximately 24 mm to approximately 40 mm of the radial positions of the disc substrate.

Thus, according to the present invention, the protective film with a film thickness not less than approximately 15 km can be formed without producing substantial variations in the film thickness. Specifically, with the embodiment of FIG. 10, the film thickness difference between the film thickness of the protective film 4 on the inner rim side of the disc substrate 7 and that on the its outer rim side is suppressed to approximately 2 μm even if the protective film 4 produced is of the average film thickness of approximately 16 μm.

If the film thickness variation is small over the entire surface of the disc substrate 7, recording/reproduction may be made with the laser light falling on the protective film side. That is, if the disc substrate 7 in its entirety exhibits only little variation in film thickness of the protective film 4, stable recording/reproduction may be achieved if the laser light falls on the protective film side because there is no portion exhibiting significant wavefront aberration.

For example, if, with the use of an optical device in which the laser light falls on the protective film side, the wavefront aberration over the entire surface of the recording/reproducing area is 0.9 for the wavelength λ of the laser light of 480 nm and for the numerical aperture NA of the objective lens converging the laser light on the disc substrate 7 is 0.9, the film thickness variation of the protective film needs to be suppressed to not larger than 2.9 μm. As may be seen from the above-mentioned measured results, the film thickness variation of the protective film can be suppressed to not larger than approximately 2 μm by application of the present invention. Thus, if the laser light is caused to fall on the protective film side, with the wavelength λ of the laser light of 480 nm and the numerical aperture of the objective lens of 0.9, the wavefront aberration can be suppressed to not larger than 0.19 λ.

That is, if, with the magneto-optical disc the protective film 4 of which has been produced in accordance with the present invention, the laser light is caused to fall from the protective film side, the wavefront aberration is not increased due to variation in the film thickness of the protective film 4, thus enabling the laser light to be illuminated on the recording layer in stability.

Also, with the magneto-optical disc the protective film of which has been produced in accordance with the present invention, only small variation of the film thickness of the protective film is produced, such that, if a magnetic head floated a minor distance above the magneto-optical disc surface is used for recording signals, the signals can be recorded with the predetermined distance maintained between the magnetic head and the magneto-optical disc without the magnetic head being contacted with the disc surface.

Also, with the magneto-optical disc the protective film of which has been produced in accordance with the present invention, since there is only little variation in film thickness of the protective film, the separation between the magneto-optical disc surface and the magnetic head is not changed when recording signals with a predetermined constant distance maintained between the disc surface and the magnetic head, thus enabling the magnetic field to be applied in stability across the recording layer.

Figure 14:
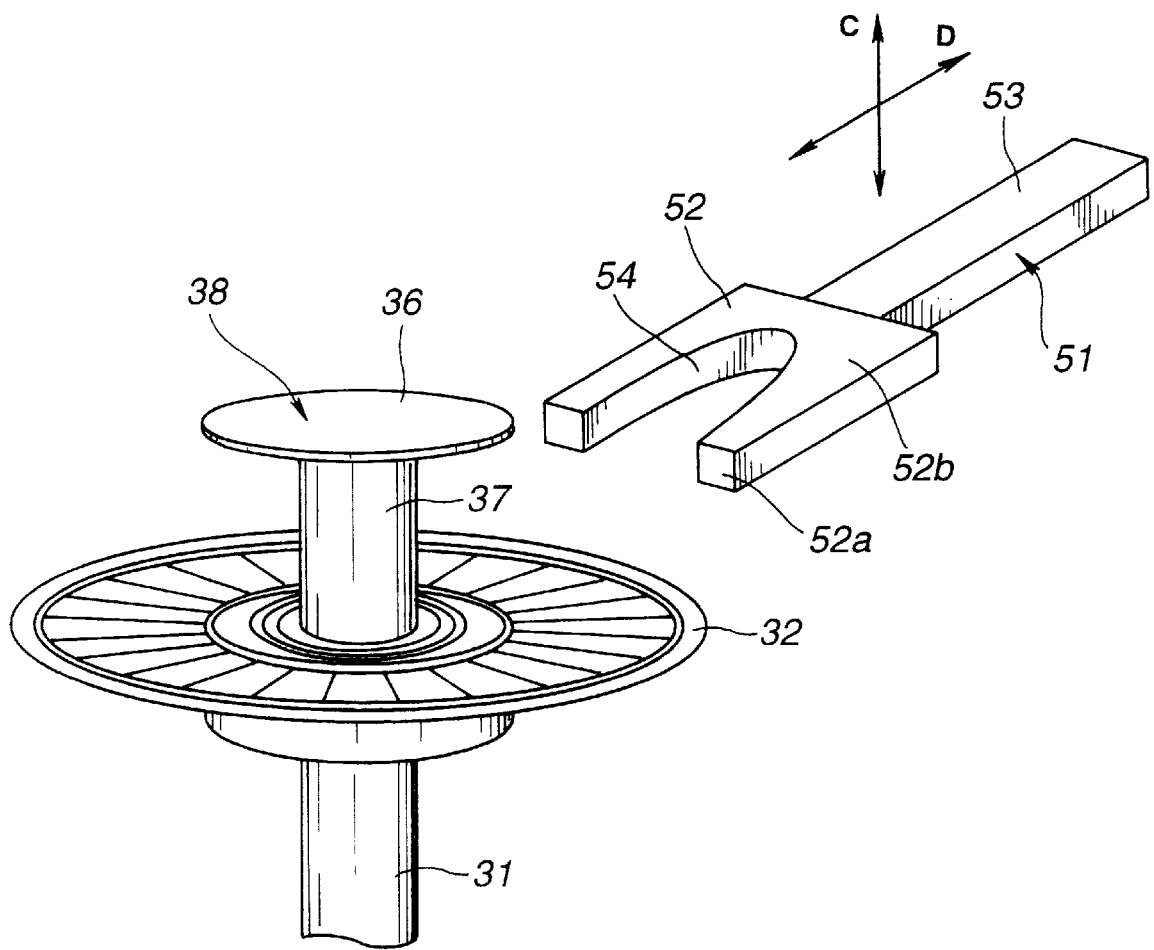
FIG. 14 is a schematic perspective view showing essential portions of a structure of an arm used for transferring a rotating disc portion of the device for manufacturing the disc-shaped recording medium shown in FIG. 11.

For example, if the magnetic head in which the separation between the magneto-optical disc surface and the magnetic head is set to 5 μm is used, and the variation of the film thickness of the protective film 4 is not larger than ±1 μm over the entire surface of the disc substrate 7, the separation between the recording layer of the magneto-optical disc and the recording layer is 5 μm±1 μm. At this time, the amount of variation of the magnetic field applied across the recording layer by the magnetic head is of the order of ±4 Oe, as shown in FIG. 14.

That is, with the magneto-optical disc in which the variation of the film thickness of the protective film 4 is suppressed to not more than ±1 μm over the entire disc surface, the variation of the magnetic field applied by the magnetic head across the recording layer, which variation is caused by variation in film thickness of the protective film, can be suppressed to not larger than ±4 Oe. The magnetic field variation of this order of magnitude is not inconvenient in photomagnetic recording.

That is, in the magneto-optical disc the protective film of which has been produced in accordance with the present invention, the protective film thickness undergoes only small variation, so that, if recording is made under such a condition in which the separation between the magneto-optical disc surface and the magnetic head is maintained constant, the magnetic field can be applied in stability across the recording layer thus enabling the recording pits to be formed in stability on the entire surface of the magneto-optical disc.

In the above-described method and apparatus for forming a protective film, any suitable coating liquid may be used, if such liquid is used as a protective film material for the magneto-optical disc, such as the acrylic UV curable resin. Although the coating liquid having the viscosity of the order of 500 cps as shown in the above example, the viscosity value may be varied from the above given value by controlling e.g., the polymerization degree.

In the above example, the magneto-optical disc having the protective film formed thereon is of a single-plate structure, in which the recording layer and the protective film layer are formed on only the single side of the substrate. This, however, is merely illustrative since the magneto-optical disc produced is not limited to this specified structure. That is, the two disc substrates of the single-plate type may be bonded in a face-to-face relation to provide a double-plate type magneto-optical disc. In the double-plate type magneto-optical disc, there are formed two recording layers each having a protective film formed thereon. In the magneto-optical disc of the double plate type, the protective film is formed without film thickness difference across the inner and outer rims of the magneto-optical disc, thus assuring stable application of the recording magnetic field and stable laser light illumination.

The above-described method and apparatus for forming the protective film may be applied not only to a magneto-optical disc but also to a read-only optical disc in which signals are recorded by physical lands and recesses on the disc surface. Of course, the present method and apparatus for forming the protective film can be applied extensively to manufacture of disc-shaped recording mediums, the protective films of which are formed by applying a protective film material by a spin-coating method, such as a magnetic disc, optical disc or a phase-change disc.

Second Embodiment

A second embodiment of a disc-shaped recording medium according to the present invention is hereinafter explained.

Referring to FIGS. 5 to 7, a manufacturing device for the disc-shaped recording medium includes a rotary shaft portion 31 having, on its one end 31a, a flange 33 of a substantially toroidal planar configuration having an end 31a supporting a disc substrate 32 of a disc-shaped recording medium. The rotary shaft portion 31 has a center recess 34 opened in the end 31a. The manufacturing device for the disc-shaped recording medium also includes a rotary disc unit 38 having a disc portion 36 covering a center opening 35 of a disc substrate 32 of the disc-shaped recording medium and a center shaft 37 fitted in the recess 34 of the rotary shaft portion 31.

The rotary shaft portion 31 is substantially columnar in profile and has the flange 33 on its end 31a. The flange 33 is not provided at the distal end of the end 31a but is slightly recessed such that a projection 51 is formed on the upper surface of the flange 33. Since the projection 51 has a center recess 34, it is toroidal in planar profile, with the outer diameter shown at D2 in FIG. 13 being approximately equal to the diameter of the center opening 35 of the disc substrate 32 shown at D3 in FIG. 13. This projection 51 is fitted in the center opening 35 of the disc substrate 32.

On the opposite side 31b of the rotary shaft portion 31 to its side provided with the flange 33 is mounted a spindle motor 42 via gears 39 to 41. That is, the rotational driving power of the spindle motor 42 is transmitted via gears 41, 40 and 39 to the opposite end 31b of the rotary shaft portion 31 to rotate the rotary shaft portion 31. This causes rotation of the disc substrate 32, the center opening 35 of which is engaged by the projection 51 of the rotary shaft portion 31 and which is supported by the flange 33, in the direction indicated by arrow A in FIG. 11.

Figure 12:
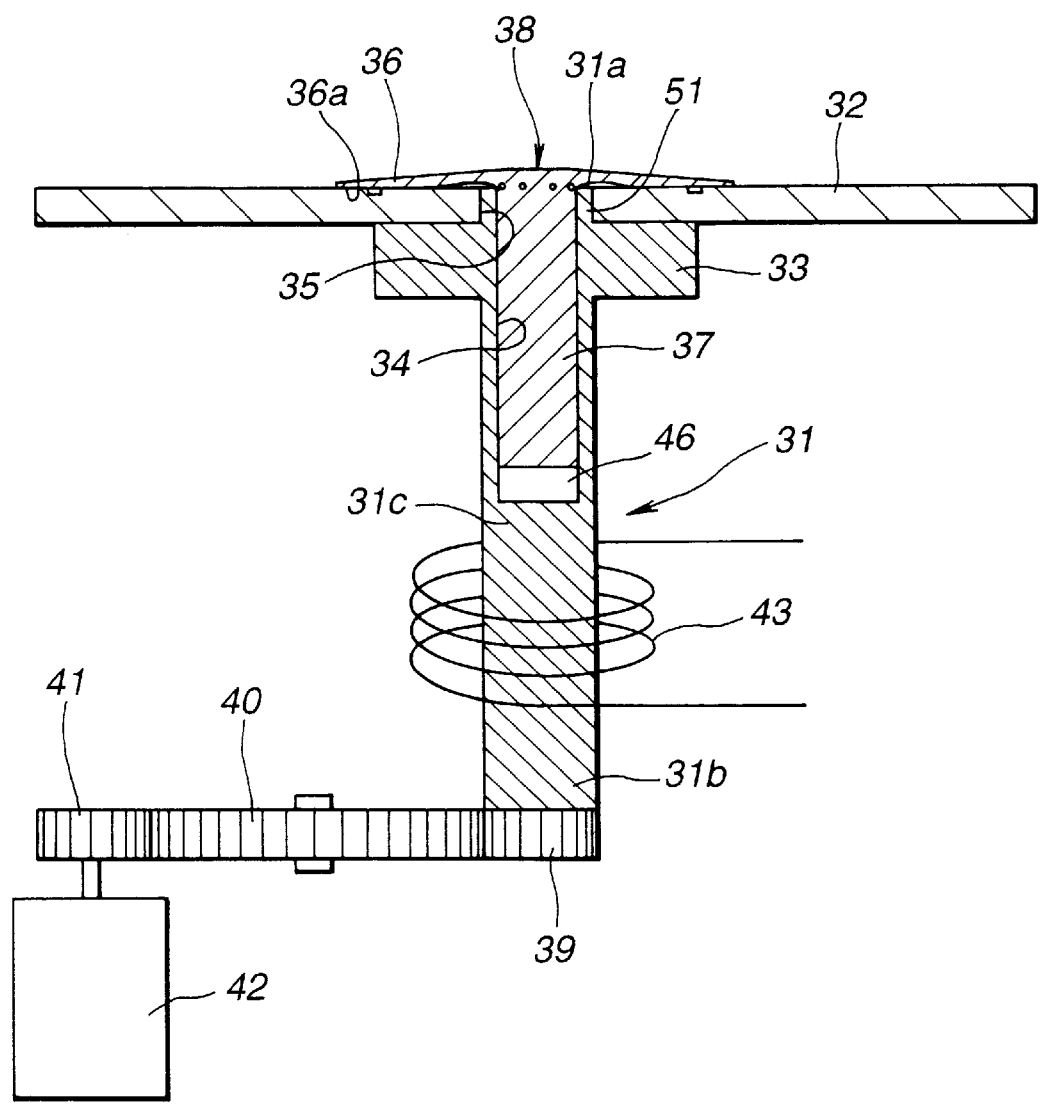
FIG. 12 is a schematic cross-sectional view showing essential portions of a device for manufacturing the disc-shaped recording medium shown in FIG. 11.

In the manufacturing device for the disc-shaped recording medium of the present embodiment, shown in FIG. 12, at least the bottom surface of the recess 34 of the rotary shaft portion 31 in particular is formed of a magnetic material. In the present embodiment, a bottom portion 31c of the rotary shaft portion 31 corresponding to the bottom of the recess 34 is formed of iron. In the present embodiment, a coil 43 is placed around the bottom portion 31c of the rotary shaft portion 31. The bottom portion 31c and the coil 43 make up an electromagnet so that a magnetic field can be produced within the recess 34.

As for the rotary disc unit 38, the disc portion 36 is circular in plan configuration. The disc portion 36 has a diameter D4 in FIG. 13 larger than the diameter of the center opening 35 of the disc substrate 32 shown at D3 so that the disc portion 36 can stop the center opening 35. Also, in the manufacturing device for the disc-shaped recording medium of the present embodiment, the disc portion 36 has the diameter shown at D4 in FIG. 9 larger than a diameter shown at D5 corresponding to the outer diameter of the groove 44 having a plan toroidal configuration and which is formed towards the inner rim side with respect to the data area used for recording the information of the disc substrate 32 so that the disc portion 36 can also stop the groove 44.

Figure 13:
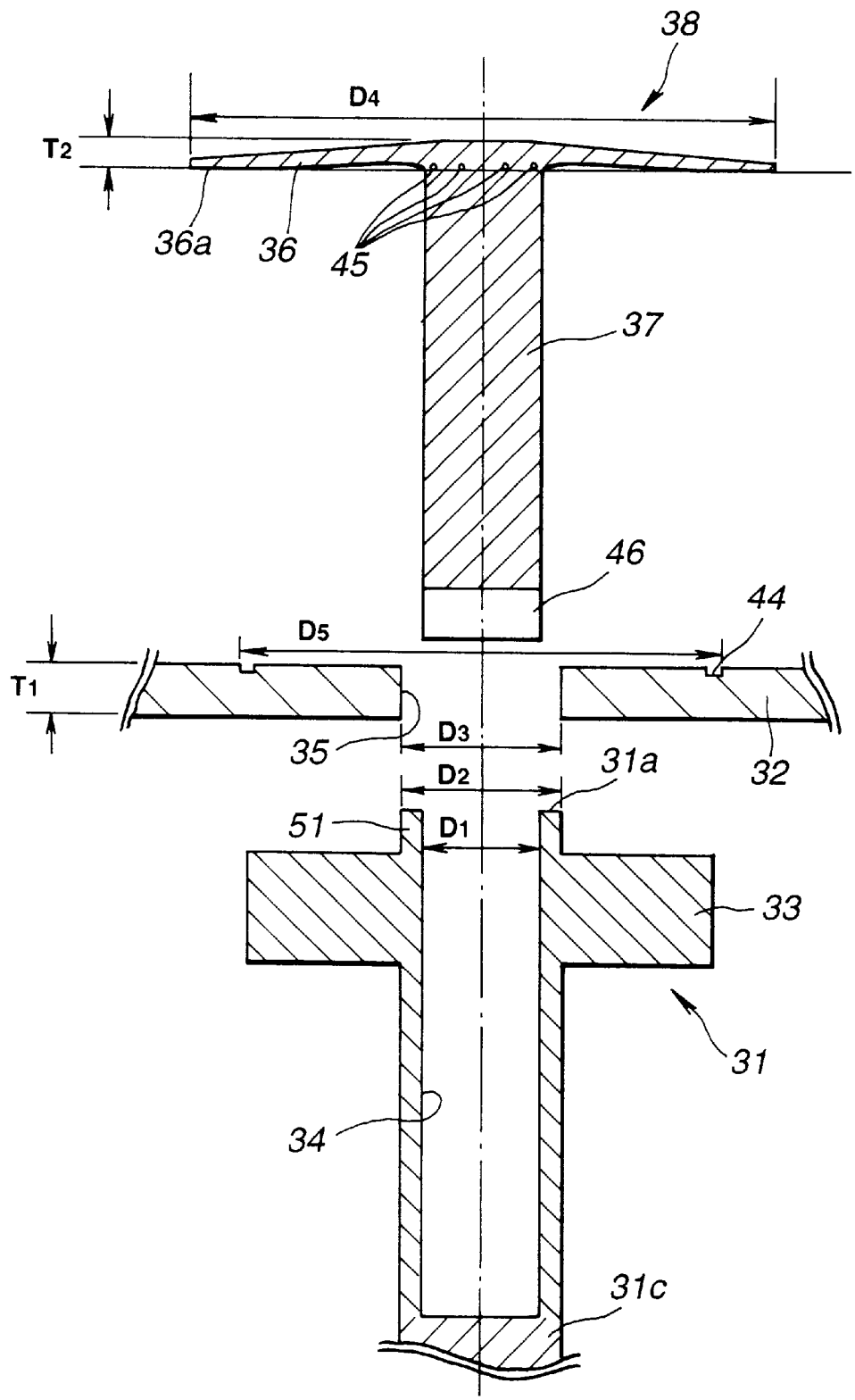
FIG. 13 is an exploded schematic cross-sectional view showing the structure of a device for manufacturing the disc-shaped recording medium shown in FIG. 11.

Referring to FIGS. 12 and 13, the inner rim side surface of a facing surface 36a of the disc portion 36 to the disc substrate 32 is recessed so that only the outer rim side surface of the facing surface 36a of the disc portion 36 is contacted with the disc substrate 32 in order to prevent the coating liquid from entering the space between the facing surface 36a and the disc substrate 32. Also, the contacting side of the disc portion 36 with the disc substrate 32 is formed of a material having a surface tension smaller than that of the coating liquid. Also, in the manufacturing device for the disc-shaped recording medium of the present embodiment, there are formed ejection openings 45 for gas ejection in the vicinity of the portions of the center shaft 37 of the rotary disc unit 38 contacted with the disc portion 36.

Moreover, in the present manufacturing device for the disc-shaped recording medium, at least the distal end of the center shaft 37 of the rotary disc unit 38 opposite to its connecting end to the disc portion 36 is formed as a permanent magnet 36.

Thus, in the present manufacturing device for the disc-shaped recording medium, if the center shaft 37 of the rotary disc unit 38 is fitted in the recess 34 of the rotary shaft portion 31, the iron of the bottom portion 31c of the rotary shaft portion 31 and the permanent magnet 36 at the distal end of the center shaft 37 of the rotary disc unit 38 attract each other for strongly securing the rotary disc unit 38 to the rotary shaft portion 31.

Also, in the manufacturing device for the disc-shaped recording medium of the present embodiment, since the coil 43 is arranged about the bottom portion 31c of the rotary shaft portion 31 for operating as an electromagnet, the magnetic field generated in the electromagnet can be controlled in orientation by the direction of the current supplied to the coil 43, so that the center shaft 37 of the rotary disc unit 38 can be attached to or detached from the recess 34 of the rotary shaft portion 31 by the generated magnetic force.

In the manufacturing device for the disc-shaped recording medium of the present embodiment, if the current is supplied to the coil 43 of the electromagnet to generate a magnetic field in an direction of repelling the magnetic field of the permanent magnet 46 of the center shaft 37 of the rotary disc unit 38, the center shaft 37 of the rotary disc unit 38 can be attached to or detached from the recess 34 of the rotary shaft portion 31 relatively easily.

Figure 11:
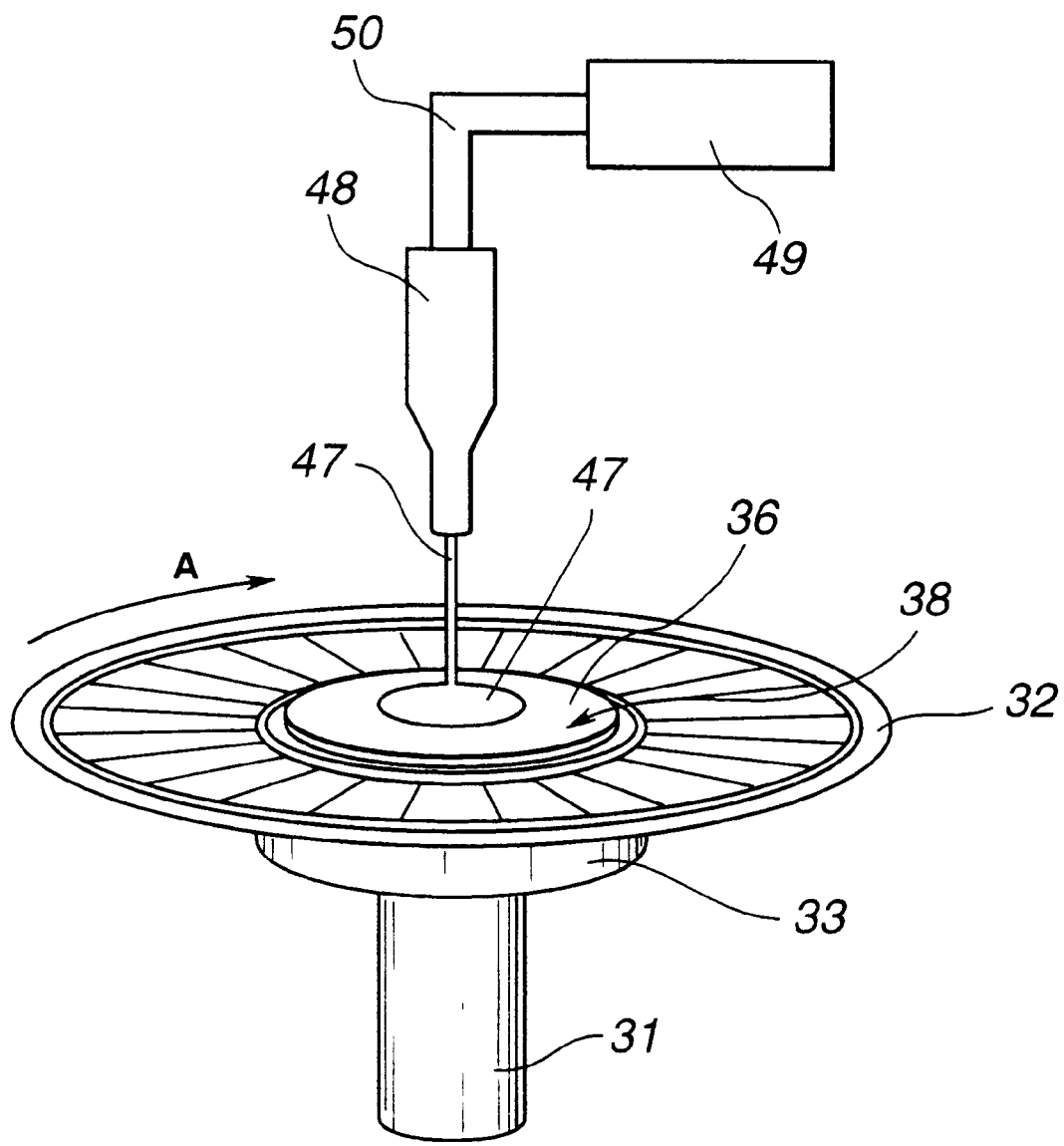
FIG. 11 is a schematic perspective view showing essential portions of an illustrative structure of the device for manufacturing a disc-shaped recording medium according to the present invention.

The manufacturing device for the disc-shaped recording medium of the present embodiment has a nozzle 48 for supplying a UV curable resin 47 to the disc substrate 32, as shown in FIG. 11. This nozzle 48 is mounted on a resin supplying unit 49 via a resin supply tube 50 to serve as coating liquid supply means. During spin coating, the nozzle 48 is mounted directly above the center of the disc portion 36 of the rotary disc unit 38 for ejecting the UV curable resin 47 to the center of rotation of the rotary disc unit 38 and the disc substrate 32. The center of the disc portion 36 of the rotary disc unit 38 is the substantially center point of rotation of the disc substrate 32 and the rotary disc unit 38 during spin coating.

In the manufacturing device for the disc-shaped recording medium of the present embodiment, there is provided an arm 51 for transferring the rotary disc unit 38, as shown in FIG. 14. This arm 51 is made up of a holder 52 for holding the rotary disc unit 38 and an arm 53 having one and the opposite ends connected to the holder 52 and to transfer means, not shown. The holder 52, shown in FIG. 14, has its distal end 52a formed with a recess 54 engaged by the center shaft 37 of the rotary disc unit 38. The holder 52 is a substantially plate-shaped member for supporting the facing surface 36a of the disc portion 36 in an in-plane direction by its upper surface 52b, and is moved with movement of the arm 53. The arm 51 is adapted for being moved in the direction of thickness and in the in-plane direction of the disc substrate 32, by transfer means, not shown, in the direction indicated by arrows C and D in FIG. 14.

Although the holder 52 has the recess 54 in which is engaged the center shaft 37, it can also be configured for setting the rotary disc unit 38 thereon. In this case, the holder is preferably designed so that any residual resin will not be left on the end of the rotary disc unit 38.

The method for forming a protective film on the disc substrate by the present manufacturing device for the disc-shaped recording medium is explained. First, the projection 51 of the rotary shaft portion 31 is fitted in the center opening 35 of the disc substrate 32 in order to set the disc substrate 32 on the flange 33. The disc substrate 32 has a thickness T1 in FIG. 13 equal to 1.2 mm, an outer diameter of 86 mm, an outer diameter D5 of the groove 44 equal to 34 mm and the diameter D3 of the center opening 35 equal to 15 mm. The groove 44 is formed by a substrate forming stamper during molding of the disc substrate 32 and is formed towards the inner rim side with respect to a data area in which to store information signals. Of course, the recording layer is formed on the disc substrate 32.

The rotary disc unit 38 is then held by the arm 51 and the arm 51 is moved in the in-plane direction of the disc substrate 32, in the direction indicated by arrow D in FIG. 14, so that the center shaft 37 of the rotary disc unit 38 is directly above, the recess 34 of the rotary shaft portion 31. The arm 51 is moved along the direction of thickness of the disc substrate 32 indicated by arrow C in FIG. 14, so that the center shaft 37 will be inserted into the recess 34 of the rotary shaft portion 31. The rotary disc unit 38 may be such a rotary disc unit in which the disc portion 36 has a thickness T2 and a diameter D4 of FIG. 13 equal to 3.0 mm and 35 mm, respectively.

Then, with the center shaft 37 inserted halfway into the recess 34 by the arm 51, the current is supplied to the coil 43 to generate in the recess 34 a magnetic field of a direction repelling the magnetic field of the permanent magnet 46. When the repulsive force by the magnetic field is counterbalanced by the self-weight of the rotary disc unit 38, the arm 51 is moved in the in-plane direction of the disc substrate 32 as indicated by arow D in FIG. 14 to extract the arm 51 from the rotary disc unit 38. Since the repulsive force by the magnetic field is counterbalanced by the force due to the self-weight of the rotary disc unit 38, there is no risk of abrupt descent of the rotary disc unit 38.

Then, as the current to be supplied to the coil 43 is decreased gradually to reduce the magnetic field generated by the electromagnet gradually, the rotary disc unit 38 is lowered gradually. When the current supplied to the coil 43 is reduced to zero, the permanent magnet 46 is sucked by iron of the bottom portion 31c to secure the rotary disc unit 38 positively to the rotary shaft portion 31.

At this time, the disc substrate 32 is clinched in the direction of thickness by the disc portion 36 of the rotary disc unit 38 and the flange 33 of the rotary shaft portion 31 so as to be supported with its center opening 35 closed by the disc portion 36 of the rotary disc unit 38. Thus, the disc substrate 32 is rotated by rotation of the rotary shaft portion 31 in the direction indicated by arrow A in FIG. 11. Since the diameter D4 of the disc portion 36 is 35 mm and the outer diameter D5 of the groove 44 of the disc substrate 32 is 34 mm, the groove 44 is also covered by the disc portion 36 so that the area of the disc substrate 32 on the radially inner side of the data area carrying the information signals is covered by the disc portion 36.

The spindle motor 42 is then run in rotation for rotating the rotary shaft portion 31 at an rpm of the order of 30 via gears 41, 40 and 39. Thus, the disc substrate 32 set on the flange 33 of the rotary shaft portion 31 and the rotary disc unit 38 are also run in rotation at the same speed as the rotary shaft portion 31.

Then, as the disc substrate 32 and the rotary disc unit 38 are run in rotation at the above-mentioned rpm, the UV curable resin 47 is supplied from the nozzle 48 onto the disc substrate 32, as shown in FIG. 11. In the present embodiment, since the nozzle 48 as coating liquid supplying means is arranged directly above the center of the disc portion 36 of the rotary disc unit 38 representing the center of rotation of the disc substrate 32 and the rotary disc unit 38, the UV curable resin 47 can be supplied to approximately the center of the disc substrate 32. In other words, the UV curable resin 47 can be supplied without evading the center of rotation. In the present embodiment, the UV curable resin 47 used has a viscosity of the order of 500 cps.

The rpm of the rotary shaft portion 31 is then increased to 3000 rpm at which it is maintained for eight sec. By maintaining the rpm of 3000 for eight sec, the UV curable resin 47 supplied to the center of rotation of the rotary disc unit 38 is spread under the centrifugal force towards the outer rim of the disc substrate 32 to apply the resin to the entire surface of the disc substrate 32, that is to the recording layer, so that a coating layer of the UV curable resin 47 is formed on the disc substrate 32.

In the manufacturing device for the disc-shaped recording medium of the present embodiment, since the inner rim side of the facing surface 36a of the disc portion 36 of the rotary disc unit 38 is recessed so that only its outer rim side is contacted with the disc substrate 32, the UV curable resin 47 may be prevented from entering the space between the facing surface 36a and the disc substrate 32.

After stopping the rotation of the rotary shaft portion 31, the current is supplied to the coil 43 and a magnetic field operating in a direction of repelling the magnetic field generated by the permanent magnet 46 is generated in the recess 44. By the repulsive force of the magnetic fields, the center shaft 37 of the rotary disc unit 38 is uplifted to a floated position in which the repulsive force is counterbalanced by the self-weight of the rotary disc unit 38.

In the manufacturing device for the disc-shaped recording medium of the present embodiment, since the ejection openings 45 capable of ejecting a gas is provided in the vicinity of the connecting area of the center shaft 37 of the rotary disc unit 38 to the disc portion 36, the UV curable resin 47 can be prevented from entering the space between the facing surface 36a and the disc substrate 32 by ejecting the gas via the ejection openings 45 during uplifting of the rotary disc unit 38.

The arm 51 is then moved in the in-plane direction of the disc substrate 32 as shown by arrow D in FIG. 14 and the center shaft 37 is fitted in the recess 54 of the holder 52, at the same time as the facing surface 36a of the disc portion 36 is supported by its upper surface. The arm 51 is then moved in the direction indicated by arrow C in FIG. 14 along the thickness of the disc substrate 32 to extract the rotary disc unit 38 completely from the rotary shaft portion 31. The arm 41 is then moved in a receding direction in the in-plane direction of the disc substrate 32, as indicated by arrow D in FIG. 14.

Then, for illuminating UV light on the disc substrate 32, coated with the UV curable resin 47, the disc substrate 32 is dismounted from the rotary shaft portion 31 and moved to a UV light illuminating portion, not shown. The UV curable resin 47 is then irradiated with the UV light and cured to form a protective film.

In the manufacturing device for the disc-shaped recording medium of the present embodiment, if the center shaft 37 of the rotary disc unit 38 is fitted in the recess 34 of the rotary shaft portion 31 and the disc substrate 32 is clinched in the direction of its thickness between the flange 33 of the rotary shaft portion 31 and the disc portion 36 of the rotary disc unit 38, the disc substrate 32 is supported with the center opening 35 stopped by the disc portion 36 of the rotary disc unit 38 so that the disc substrate 32 is rotated on rotating the rotary shaft portion 31.

In the present manufacturing device for the disc-shaped recording medium, since the center opening 35 of the disc substrate 32 is stopped, the UV curable resin 47 can be supplied to approximately the center of the disc substrate 32. In other words, the UV curable resin 47 can be supplied without evading the center of rotation of the disc substrate 32. Since the supply point of the UV curable resin 47 is approximately the center of rotation of the disc substrate 32, the film thickness of the stretched and formed coating film undergoes only small variation to provide a disc-shaped recording medium having a protective film having a suppressed film thickness difference across the inner and outer rims o the disc.

Also, in the manufacturing device for the disc-shaped recording medium of the present embodiment, since at least the bottom side of the recess 34 of the rotary shaft portion 31 is formed of magnetic metal and at least the distal end of the center shaft 37 of the rotary disc unit 38 is formed as a permanent magnet 46, the center shaft 37 of the rotary disc unit 38 is strongly fitted in the recess 34 of the rotary shaft portion 31.

Moreover, in the manufacturing device for the disc-shaped recording medium of the present embodiment, since a magnetic field opposite in direction to the magnetic field generated by the permanent magnet 46 is generated by allowing the current to flow in the coil 43 of the electromagnet, the center shaft 37 of the rotary disc unit 38 can be easily fitted in or disengaged from the recess 34.

Meanwhile, in the manufacturing device for the disc-shaped recording medium of the present embodiment, there is generated a magnetic field opposite in direction to the magnetic field of the permanent magnet 46 on the center shaft 37 of the rotary disc unit 38 by allowing the current to flow in the coil 43 of the electromagnet, the direction of the magnetic field generated by the permanent magnet 46 can also be adjusted by the current direction. If the direction of the magnetic field of the electromagnet is matched to that of the permanent magnet 46, the center shaft 37 of the rotary disc unit 38 can be fitted more strongly in the recess 34 of the rotary shaft portion 31.

For confirming the effect of the present invention, the following experiment was conducted: That is, a protective film was formed on the above-mentioned disc substrate. The relation between the distance from the center of rotation of the disc substrate and the film thickness of the protective film is shown in FIG. 15, in which the abscissa and the ordinate denote the distance in mm from the center of rotation of the disc substrate and the film thickness in $\mu$m of the protective film, respectively.

Figure 15:
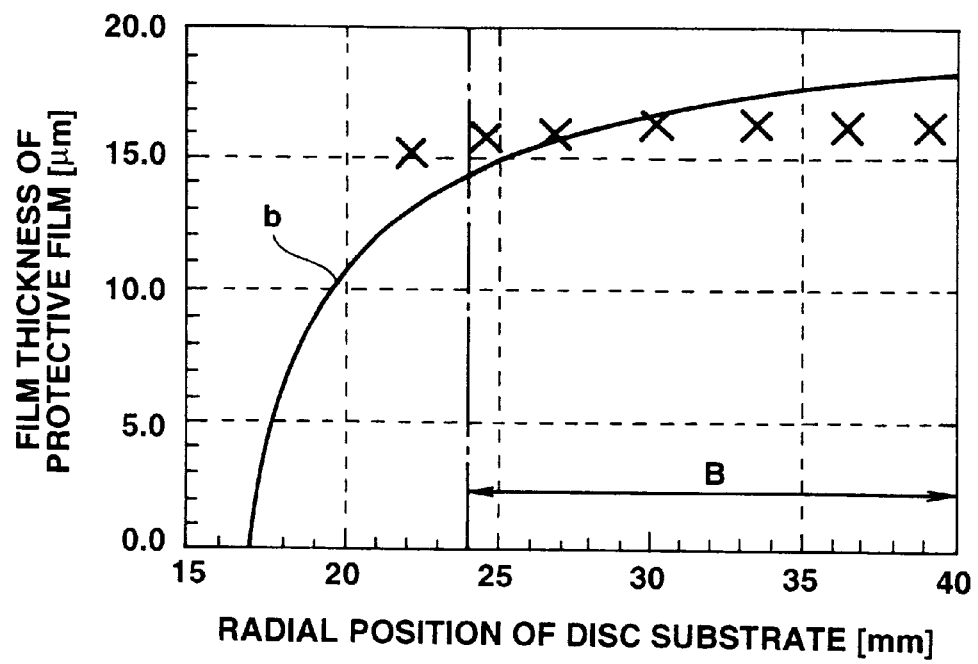
FIG. 15 is a graph showing the relation between the distance from the center of rotation of the disc substrate and the film thickness of the protective film.

In FIG. 15, the film thickness of the protective film, formed as described above, at a predetermined distance from the center of rotation of the disc substrate, is denoted as X, while the calculated values when the protective film is formed on rotating the disc substrate by the conventional method are shown for comparison sake by a solid line b. In FIG. 15, the area of the disc substrate which is to be the recording layer is denoted as a range B. This range B is an area in which to form a protective film. This range B, corresponding to the radial position of 24 to 40 mm of the disc substrate, is an area in which to form the protective film.

As may be seen from FIG. 15, the film thickness of the protective film, produced as described above, is approximately 16 $\mu$m for the range from the distance of 24 mm to 16 mm from the center of rotation of the disc substrate. By the film thickness being not less than 15 $\mu$m, corrosion of the recording layer can be prohibited sufficiently. Also, the variation in the film thickness of the protective film in the range of the distance of 24 to 40 mm from the center of rotation of the disc substrate, is not more than 2.0 $\mu$m.

In the comparative example, shown by the solid line b in FIG. 15, the film thickness of the protective film tends to be larger from the inner rim towards the outer rim of the entire area of the disc substrate. Also, in this comparative example, the film thickness of the disc substrate is thicker towards the outer rim even in a range of 24 mm to 40 mm from the center of rotation of the disc substrate.

It is thus confirmed from the above results of the experiments that, if the protective film is formed as described above, a protective film of the film thickness not less than approximately 15 $\mu$m can be formed in the range B in which is formed the recording layer, and that there can be formed a protective film in which the film thickness difference across the inner and outer rims of the disc substrate is suppressed to not more than 2 $\mu$m.

Also, in the above-described protective film, in which the film thickness difference of the protective film on the entire surface of the disc substrate is not more than 2 $\mu$m, there is no portion of the disc substrate where the error of the wavefront aberration becomes larger over the entire surface of the disc substrate even if the laser light is incident on the protective film side.

That is, the above-described protective film is formed so that, if an optical apparatus in which the laser light is incident on the side of the protective film and the wavelength of the laser light and the numerical aperture NA of a lens converging the laser light on the disc substrate are 480 nm and 0.9, respectively, the film thickness difference of the protective film is not larger than 2.9 $\mu$m which is the upper limit of the film thickness difference for which the wavefront aberration is 0.19 $\lambda$ or less.

Thus, with the magneto-optical disc carrying this protective film, the laser light can be illuminated in stability on the recording layer without increasing the wavefront aberration error due to the film thickness difference even on recording/ reproduction employing an optical system designed for high recording density.

Also, if the protective film is formed in this manner, signals can be recorded without injuring the magneto-optical disc surface due to film thickness difference of the protective film even with the use of the magnetic head adapted for sliding on the magneto-optical disc for recording signals.

Moreover, if the protective film is formed in this manner, the magnetic head is not contacted with the magneto-optical disc surface even if a magnetic head floated by a minor distance from the disc surface is used for recording signals, so that signals can be recorded at the predetermined separation between the magnetic head and the disc surface, that is without the risk of the magnetic head contacting with the disc surface.

Thus, if the protective film is formed in this manner, the magnetic field can be applied in stability across the recording layer so that recording pits can be formed in stability on the entire surface of the magneto-optical disc.

In the above-described manufacturing device for the disc-shaped recording medium, any suitable coating liquid may be used if only the coating liquid used is routinely used as a material for the coating film for the magneto-optical disc, such as an acrylic UV curable resin. Although the UV curable resin with the viscosity of the order of approximately 500 cps is used in the above embodiments, the viscosity value may be changed by controlling e.g., the polymerization degree.

Also, in the above-described embodiments, a single-plate structure in which a recording layer is formed only on one side of the substrate is shown as a disc substrate on which to form the protective film in the preparation of the single plate type magneto-optical disc. However, the magneto-optical disc manufactured is not limited to this type of the magneto-optical disc. That is, the double-plate type magneto-optical disc may be produced by bonding the disc substrates of the single plate type. In the magneto-optical disc of the double plate type, two recording layers each carrying a protective film are provided on both sides. In the double plate type magneto-optical disc, laser light illumination and application of the recording magnetic field can be achieved in stability by forming the protective film for the magneto-optical disc so that there is no film thickness difference across its inner and outer rims.

Moreover, the above-described manufacturing device for the disc-shaped recording medium can be applied to manufacture not only of the magneto-optical disc but to a read-only optical disc in which signals are recorded by physical lands and recesses on the disc surface. In addition, the manufacturing device for the disc-shaped recording medium is widely applicable to manufacture of the disc-shaped recording medium in which a protective film is formed by applying a material of a protective film by the spin coating method, such as a manufacturing device, optical disc or a phase-change disc.

What is claimed is:

1. An apparatus for manufacturing a disc-shaped recording medium, said apparatus comprising:

a turntable adapted for rotation and upon which a disc-shaped recording medium having a center opening is set, said turntable having a center recess coincident with said center opening of said recording medium;

a device operably configured to cause said turntable to rotate;

a rotary disc having a disc portion and a shaft provided at and extending from a center of said disc portion, said disc having a tapered portion imparted by a gradually thickening of said disc portion proceeding along a radius from an outer rim toward the center thereof along said rotary disk being configured to be mounted on said turntable together with said recording medium with said shaft extending through said center opening of said recoding medium and into said center recess of the turntable thereby securing said recording medium on said turntable, said rotary disc being configured such that a gap is provided about said shaft and between said recording medium and said disc portion; and a coating liquid dispenser which supplies coating liquid to the center of the rotary disc and said recording medium when said shaft of said rotary disc is inserted into said turntable recess, said coating liquid spreading out over said recording medium under the influence of centrifugal force when said turntable is rotated to thereby form a film on said recording medium.

2. The apparatus of claim 1, wherein said at least a bottom portion of said turntable defining said recess comprises a magnet and at least a distal end of said shaft of said rotary disk is formed of a magnetic material.

3. The apparatus of claim 2, further comprising a coil operatively arranged togther with said turntable to form an electromagnet.

4. The apparatus of claim 3, operatively configured to cause a current to flow in the coil of the electromagnet to generate a magnetic field effective to repel the rotary disc shaft.

5. The apparatus of claim 1, wherein said rotary disk further comprises an opening extending through said shaft via which gas can be ejected.

6. The apparatus of claim 5, wherein said at least a bottom portion of said turntable defining said recess comprises a magnet and at least a distal end of said shaft of said rotary disk is formed of a magnetic material.

7. The apparatus of claim 6, further comprising a coil operatively arranged togther with said turntable to form an electromagnet.

8. The apparatus of claim 7, operatively configured to cause a current to flow in the coil of the electromagnet to generate a magnetic field effective to repel the rotary disc shaft.

9. The apparatus of claim 1, further comprising a laser operative to irradiate said recording medium to thereby effect recording of signals on the recording medium.

10. An apparatus for manufacturing a disc-shaped recording medium, said apparatus comprising:
   a turntable adapted for rotation and upon which a disc-shaped recording medium having a center opening is set, said turntable having a center recess coincident with said center opening of said recording medium;
   a device operably configured to cause said turntable to rotate;
   a rotary disc having a disc portion and a shaft provided at and extending from a center of said disc portion, said rotary disk being configured to be mounted on said turntable together with said recording medium with said shaft extending through said center opening of said recording medium and into said center recess of the turntable thereby securing said recording medium on said turntable, said rotary disc being configured such that a gap is provided about said shaft and between said recording medium and said disc portion, said shaft having an opening extending therethrough via which gas can be ejected; and
   a coating liquid dispenser which supplies coating liquid to the center of the rotary disc and said recording medium when said shaft of said rotary disc is inserted into said turntable recess, said coating liquid spreading out over said recording medium under the influence of centrifugal force when said turntable is rotated to thereby form a film on said recording medium.

11. The apparatus of claim 10, wherein said at least a bottom portion of said turntable defining said recess comprises a magnet and at least a distal end of said shaft of said rotary disk comprises magnetic material.

12. The apparatus of claim 11, further comprising a coil operatively arranged togther with said turntable to form an electromagnet.

13. The apparatus of claim 12, operatively configured to cause a current to flow in the coil of the electromagnet to generate a magnetic field effective to repel the rotary disc shaft.

14. The apparatus of claim 11, further comprising a laser operative to irradiate said recording medium to thereby effect recording of signals on the recording medium.

15. An apparatus for manufacturing a disc-shaped recording medium, said apparatus comprising:
   a turntable adapted for rotation and upon which a disc-shaped recording medium having a center opening is set, said turntable having a center recess coincident with said center opening of said recording medium, at least a bottom portion of said turntable defining said recess comprises a magnet;
   a device operably configured to cause said turntable to rotate;
   a rotary disc having a disc portion and a shaft provided at and extending from a center of said disc portion, said rotary disk being configured to be mounted on said turntable together with said recording medium with said shaft extending through said center opening of said recoding medium and said center recess of the turntable thereby securing said recording medium on said turntable, said rotary disc being configured such that a gap is provided about said shaft and between said recording medium and said disc portion, at least a distal end of said shaft comprises magnetic material effective to enable a repelling force to be established between said turntable magnet and said shaft; and
   a coating liquid dispenser which supplies coating liquid to the center of the rotary disc and said recording medium when said shaft of said rotary disc is inserted into said turntable recess, said coating liquid spreading out over said recording medium under the influence of centrifugal force when said turntable is rotated to thereby form a film on said recording medium.

16. The apparatus of claim 15, further comprising a laser operative to irradiate said recording medium to thereby effect recording of signals on the recording medium.

17. The apparatus of claim 15, further comprising a coil operatively arranged togther with said turntable to form an electromagnet.

18. The apparatus of claim 17, operatively configured to cause a current to flow in the coil of the electromagnet to generate a magnetic field effective to repel the rotary disc shaft.

* * * * *